US010447894B2

(12) United States Patent
Yamashita et al.

(10) Patent No.: US 10,447,894 B2
(45) Date of Patent: Oct. 15, 2019

(54) PROFILE ADJUSTMENT METHOD, AND PROFILE ADJUSTMENT SYSTEM

(71) Applicant: SEIKO EPSON CORPORATION, Tokyo (JP)

(72) Inventors: Mitsuhiro Yamashita, Nagano (JP); Kenji Fukasawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/012,882

(22) Filed: Jun. 20, 2018

(65) Prior Publication Data

US 2018/0376030 A1    Dec. 27, 2018

(30) Foreign Application Priority Data

Jun. 22, 2017   (JP) ................. 2017-122242

(51) Int. Cl.
*H04N 1/04* (2006.01)
*H04N 1/60* (2006.01)
*H04N 1/00* (2006.01)

(52) U.S. Cl.
CPC ....... *H04N 1/6025* (2013.01); *H04N 1/00023* (2013.01); *H04N 1/00087* (2013.01); *H04N 1/60* (2013.01); *H04N 1/6019* (2013.01); *H04N 1/6036* (2013.01); *H04N 1/6016* (2013.01); *H04N 1/6033* (2013.01); *H04N 1/6055* (2013.01)

(58) Field of Classification Search
CPC ...... H04N 1/6025; H04N 1/60; H04N 1/6019; H04N 1/6036; H04N 1/6016; H04N 1/6033; H04N 1/6055

USPC ......................................... 358/1.9
See application file for complete search history.

(56) References Cited

U.S. PATENT DOCUMENTS

| | | | |
|---|---|---|---|
| 2003/0053097 A1 | 3/2003 | Ohga et al. | |
| 2006/0170995 A1 | 8/2006 | Ariga | |
| 2008/0158579 A1 | 7/2008 | Ohga et al. | |
| 2010/0110457 A1* | 5/2010 | Kaneko | H04N 1/603 358/1.9 |
| 2016/0241745 A1 | 8/2016 | Ohba | |

FOREIGN PATENT DOCUMENTS

| | | |
|---|---|---|
| EP | 1199883 A1 | 4/2002 |
| JP | 2000-004369 A | 1/2000 |
| JP | 2006-129508 A | 5/2006 |
| JP | 2006-174371 A | 6/2006 |
| JP | 2007-043415 A | 2/2007 |
| JP | 2016-213646 A | 12/2016 |
| JP | 2017-111410 A | 6/2017 |

OTHER PUBLICATIONS

The Extended European Search Report for the corresponding European Patent Application No. 18178687.2 dated Oct. 10, 2018.

* cited by examiner

*Primary Examiner* — Houshang Safaipour

(57) ABSTRACT

A profile adjustment method of adjusting a correspondent relation between coordinate values of an input color space and coordinate values of an output color space is a method including: storing history information indicating adjustment content of a first table defining the correspondent relation in a first profile at a private tag of the first profile; reading the history information from the private tag of the first profile; and using the read history information for at least one of readjustment of the first table and adjustment of a second table defining the correspondent relation in a second profile.

19 Claims, 30 Drawing Sheets

FIG. 3

| No | ADJUSTMENT DAY | ADJUSTMENT TIME | NUMBER OF ADJUSTMENT POINTS | ADJUSTMENT CONTENT | ORIGINAL TABLE |
|---|---|---|---|---|---|
| 1 | 2017/3/20 | 10:50 | 106 | | ORIGINAL TABLE 1 |
| 2 | 2017/3/20 | 13:12 | 5 | | |
| 3 | 2017/3/29 | 16:31 | 3 | | ORIGINAL TABLE 3 |

(A) COORDINATES OF ADJUSTMENT POINT P0
(B) ADJUSTMENT TARGET T0 AT ADJUSTMENT POINT P0
(C) FORM OF ADJUSTMENT TARGET PROFILE 550
(D) ADJUSTMENT RANGE A0 IN WHICH ADJUSTMENT POINT P0 IS SET AS BASE POINT
(E) COORDINATES OF PAIR OF ADJUSTMENT POINTS P1 AND P2
(F) FILE NAME OF COMBINED PROFILE
(G) TIME STAMP OF PROFILE OF (F)
(H) ORIGINAL TABLE BEFORE ADJUSTMENT

ADJUSTMENT HISTORY

| No | ADJUSTMENT DAY | ADJUSTMENT TIME | NUMBER OF ADJUSTMENT POINTS | COUNTERMEASURE | |
|---|---|---|---|---|---|
| 1 | 2017/3/20 | 10:50 | 106 | CONFIRM ADJUSTMENT RESULT | ▽ ~901 |
| 2 | 2017/3/20 | 13:12 | 5 | APPLY ADJUSTMENT POINT TO ANOTHER PROFILE | ▽ ~901 |
| 3 | 2017/3/29 | 16:31 | 3 | CANCEL ADJUSTMENT RESULT | ▽ ~901 |

FIG. 13C 700, 550

| No | ADJUSTMENT DAY | ADJUSTMENT TIME | NUMBER OF ADJUSTMENT POINTS | ADJUSTMENT CONTENT | ORIGINAL TABLE |
|---|---|---|---|---|---|
| 1 | 2017/3/20 | 10:50 | 106 | | ORIGINAL TABLE 1 |
| 2 | 2017/3/20 | 13:12 | 5 | | |

FIG. 14A
802

| | PREVIOUS ADJUSTMENT POINT | TREAT AS FIXED POINTS ▽ | | | | |—902
|---|---|---|---|---|---|---|
| No | C | M | Y | K | ADJUSTMENT DAY | COUNTERMEASURE |
| 1 | 50.00 | 43.00 | 0.00 | 0.00 | 2017/3/20 | TREAT AS FIXED POINTS ▽ —903 |
| 2 | 30.00 | 15.00 | 10.00 | 8.00 | 2017/3/20 | NOT TREAT AS FIXED POINTS ▽ —903 |
| 3 | 5.00 | 6.00 | 20.00 | 22.00 | 2017/3/20 | TREAT AS FIXED POINTS ▽ —903 |
| | | | | | | |

FIG. 14B
840

| ID | C | M | Y | K | ... | Radius | ... | Δc | Δm | Δy | Δk | |
|---|---|---|---|---|---|---|---|---|---|---|---|---|
| 0 | 0.00 | 0.00 | 0.00 | 0.00 | ... | 20.00 | ... | 0.00 | 0.00 | 0.00 | 0.00 | |
| 1 | 50.00 | 43.00 | 10.00 | 8.00 | ... | 20.00 | ... | 0.00 | 0.00 | 0.00 | 0.00 | ←SP |
| 2 | 5.00 | 6.00 | 20.00 | 22.00 | ... | 20.00 | ... | 0.00 | 0.00 | 0.00 | 0.00 | ←SP |

FIG. 19A  (a-1) SELECT ONLY INPUT PROFILE (A2B)
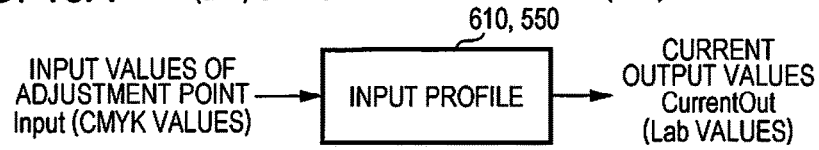
FIG. 19B  (a-2) SELECT ONLY OUTPUT PROFILE (B2A)
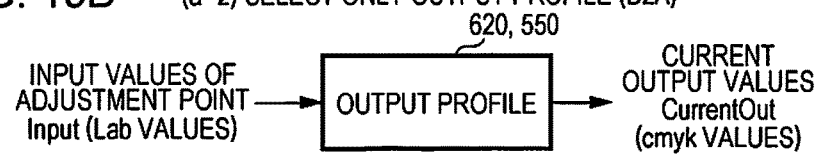
FIG. 19C  (a-3) SELECT DEVICE LINK PROFILE
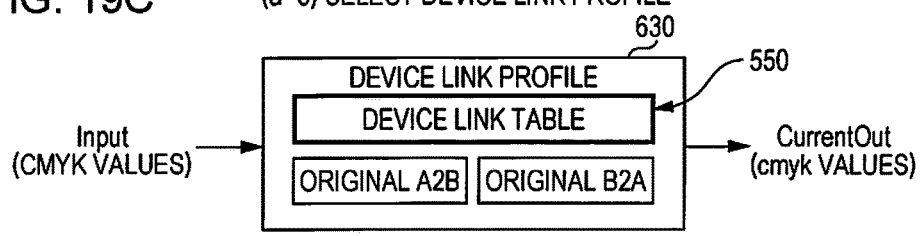
FIG. 19D
(b-1) DESIGNATE INPUT PROFILE IN COMBINATION OF INPUT AND OUTPUT PROFILES
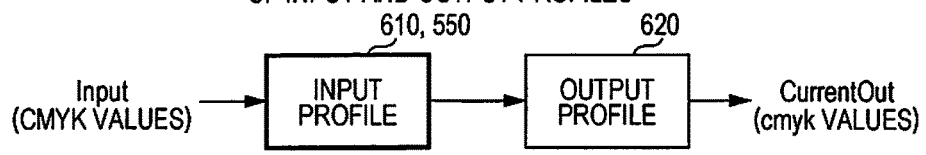
FIG. 19E
(b-2) DESIGNATE OUTPUT PROFILE IN COMBINATION OF INPUT AND OUTPUT PROFILES
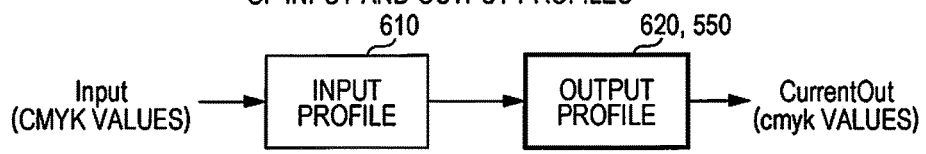

FIG. 20

{
(a-1) PROFILE IS SINGLY USED: ADJUSTMENT TARGET IS INPUT PROFILE

CurrentOut = $f_{icc}$(InputProfile, A2B, Input)

(a-2) PROFILE IS SINGLY USED: ADJUSTMENT TARGET IS OUTPUT PROFILE

CurrentOut = $f_{icc}$(OutputProfile, B2A, Input)

(a-3) PROFILE IS SINGLY USED: ADJUSTMENT TARGET IS DEVICE LINK PROFILE

CurrentOut = $f_{icc}$(DLProfile, A2B0, Input)

(b-1) PROFILE IS COMBINED TO BE USED: ADJUSTMENT TARGET IS INPUT PROFILE

CurrentOut = $f_{icc}$(OutputProfile, B2A, $f_{icc}$(InputProfile, A2B, Input))

(b-2) PROFILE IS COMBINED TO BE USED: ADJUSTMENT TARGET IS OUTPUT PROFILE

CurrentOut = $f_{icc}$(OutputProfile, B2A, $f_{icc}$(InputProfile, A2B, Input))
}

HEREIN,
InputProfile IS INPUT PROFILE,
OutputProfile IS OUTPUT PROFILE,
DLProfile IS DEVICE LINK PROFILE,
$f_{icc}$ INDICATES COLOR CONVERSION BY ICC PROFILE,
FIRST ARGUMENT IS PROFILE NAME,
A2B OF SECOND ARGUMENT INDICATES CONVERSION FROM DEVICE COLOR
TO DEVICE-INDEPENDENT COLOR,
B2A OF SECOND ARGUMENT INDICATES CONVERSION FROM DEVICE-INDEPENDENT COLOR
TO DEVICE COLOR,
A2B0 OF SECOND ARGUMENT INDICATES CONVERSION BY DEVICE LINK TABLE,
THIRD ARGUMENT IS INPUT VALUES OF ADJUSTMENT POINTS (CMYK, RGB, Lab, OR THE LIKE).

FIG. 21A   (a-1) SELECT ONLY INPUT PROFILE (A2B)
(a-1-1) SELECT INPUT COLOR SPACE IN
ADJUSTMENT TARGET COLOR SPACE

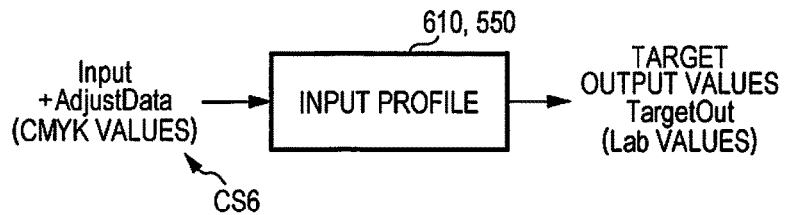

FIG. 21B   (a-1) SELECT ONLY INPUT PROFILE (A2B)
(a-1-2) SELECT OUTPUT COLOR SPACE IN
ADJUSTMENT TARGET COLOR SPACE

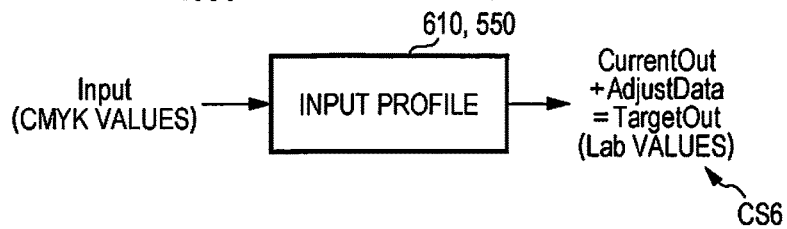

FIG. 21C   (a-2) SELECT ONLY OUTPUT PROFILE (B2A)
(a-2-1) SELECT INPUT COLOR SPACE IN
ADJUSTMENT TARGET COLOR SPACE

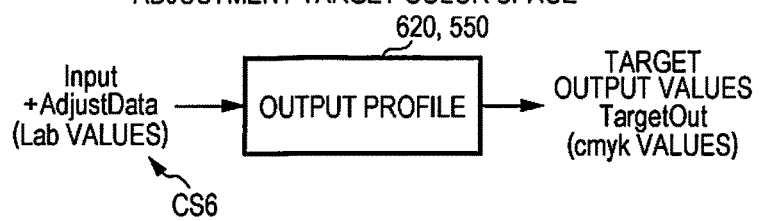

FIG. 21D   (a-2) SELECT ONLY OUTPUT PROFILE (B2A)
(a-2-2) SELECT OUTPUT COLOR SPACE IN
ADJUSTMENT TARGET COLOR SPACE

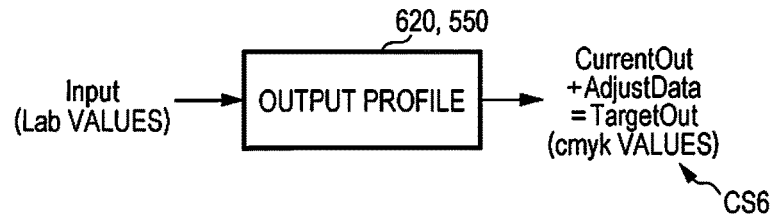

FIG. 22A (b-1) DESIGNATE INPUT PROFILE IN COMBINATION OF INPUT AND OUTPUT PROFILES
(b-1-1) SELECT INPUT COLOR SPACE IN ADJUSTMENT TARGET COLOR SPACE

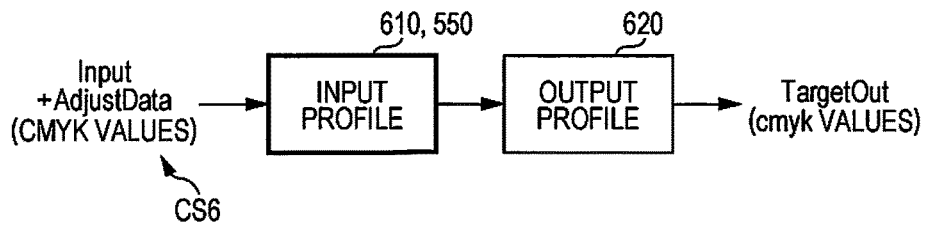

FIG. 22B (b-1) DESIGNATE INPUT PROFILE IN COMBINATION OF INPUT AND OUTPUT PROFILES
(b-1-2) SELECT OUTPUT COLOR SPACE IN ADJUSTMENT TARGET COLOR SPACE

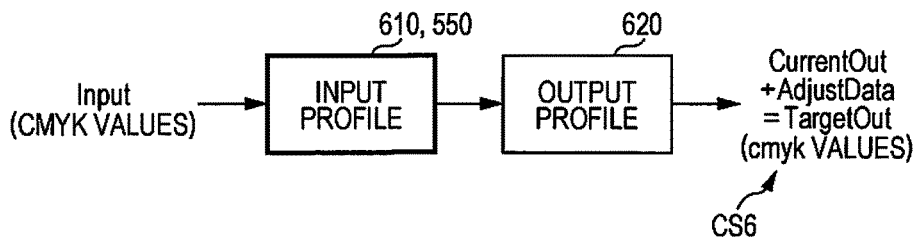

FIG. 22C (b-1) DESIGNATE INPUT PROFILE IN COMBINATION OF INPUT AND OUTPUT PROFILES
(b-1-3) SELECT PCS IN ADJUSTMENT TARGET COLOR SPACE

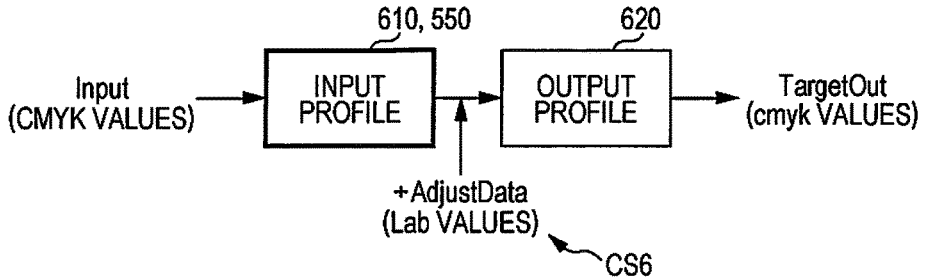

FIG. 23

(a-1) PROFILE IS SINGLY USED: ADJUSTMENT TARGET IS INPUT PROFILE (a-1-1) SELECT INPUT COLOR SPACE IN ADJUSTMENT TARGET COLOR SPACE
TargetOut = $f_{icc}$(InputProfile, A2B, Input + AdjustData)
(a-1-2) SELECT OUTPUT COLOR SPACE IN ADJUSTMENT TARGET COLOR SPACE
TargetOut = $f_{icc}$(InputProfile, A2B, Input) + AdjustData

---

(a-2) PROFILE IS SINGLY USED: ADJUSTMENT TARGET IS OUTPUT PROFILE (a-2-1) SELECT INPUT COLOR SPACE IN ADJUSTMENT TARGET COLOR SPACE
TargetOut = $f_{icc}$(OutputProfile, B2A, Input + AdjustData)
(a-2-2) SELECT OUTPUT COLOR SPACE IN ADJUSTMENT TARGET COLOR SPACE
TargetOut = $f_{icc}$(OutputProfile, B2A, Input) + AdjustData

---

(a-3) PROFILE IS SINGLY USED: ADJUSTMENT TARGET IS DEVICE LINK PROFILE (a-3-1) SELECT INPUT COLOR SPACE IN ADJUSTMENT TARGET COLOR SPACE
TargetOut = $f_{icc}$(DLProfile, A2B0, Input + AdjustData)
(a-3-2) SELECT OUTPUT COLOR SPACE IN ADJUSTMENT TARGET COLOR SPACE
TargetOut = $f_{icc}$(DLProfile, A2B0, Input) + AdjustData

---

(b-1) PROFILE IS COMBINED TO BE USED: ADJUSTMENT TARGET IS INPUT PROFILE (b-1-1) SELECT INPUT COLOR SPACE IN ADJUSTMENT TARGET COLOR SPACE
TargetOut
= $f_{icc}$(OutputProfile, B2A, $f_{icc}$(InputProfile, A2B, Input + AdjustData))
(b-1-2) SELECT OUTPUT COLOR SPACE IN ADJUSTMENT TARGET COLOR SPACE
TargetOut
= $f_{icc}$(OutputProfile, B2A, $f_{icc}$(InputProfile, A2B, Input)) + AdjustData
(b-1-3) SELECT PCS IN ADJUSTMENT TARGET COLOR SPACE
TargetOut
= $f_{icc}$(OutputProfile, B2A, $f_{icc}$(InputProfile, A2B, Input) + AdjustData)

---

(b-2) PROFILE IS COMBINED TO BE USED: ADJUSTMENT TARGET IS OUTPUT PROFILE (SAME AS (b-1) CASE)

(b-1) DESIGNATE INPUT PROFILE IN COMBINATION OF INPUT AND OUTPUT PROFILES (b-2) DESIGNATE OUTPUT PROFILE IN COMBINATION OF INPUT AND OUTPUT PROFILES

FIG. 25

| |
|---|
| (a-1) PROFILE IS SINGLY USED: ADJUSTMENT TARGET IS INPUT PROFILE<br><br>Input_P = Input<br>TargetOut_P = TargetOut |
| (a-2) PROFILE IS SINGLY USED: ADJUSTMENT TARGET IS OUTPUT PROFILE<br><br>(SAME AS (a-1) CASE) |
| (a-3) PROFILE IS SINGLY USED: ADJUSTMENT TARGET IS DEVICE LINK PROFILE<br><br>(SAME AS (a-1) CASE) |
| (b-1) PROFILE IS COMBINED TO BE USED: ADJUSTMENT TARGET IS INPUT PROFILE<br><br>Input_P = Input<br>TargetOut_P = $f_{icc}$(OutputProfile, A2B, TargetOut) |
| (b-2) PROFILE IS COMBINED TO BE USED: ADJUSTMENT TARGET IS OUTPUT PROFILE<br><br>Input_P = $f_{icc}$(InputProfile, A2B, Input)<br>TargetOut_P = TargetOut |

FIG. 28
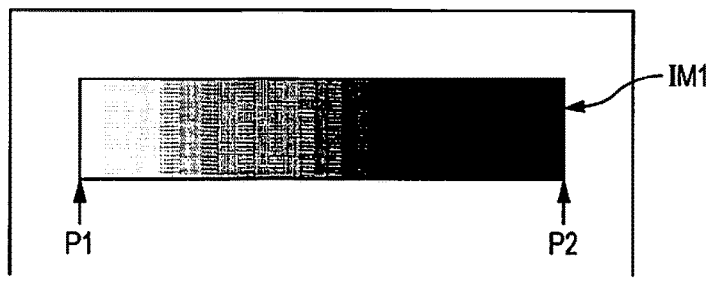
FIG. 29
(b-2) DESIGNATE OUTPUT PROFILE IN COMBINATION
OF INPUT AND OUTPUT PROFILES
(b-2-2) SELECT OUTPUT COLOR SPACE IN
ADJUSTMENT TARGET COLOR SPACE
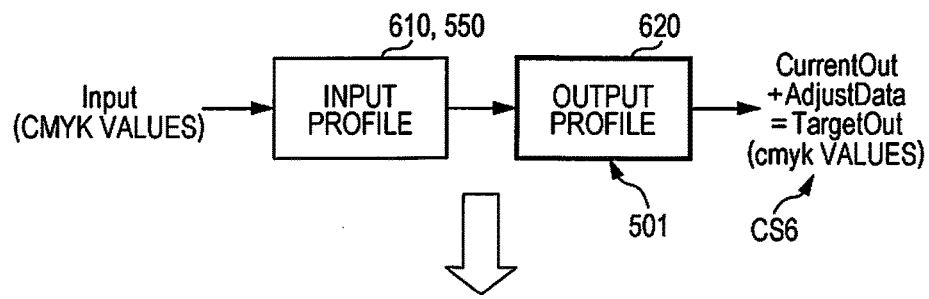
(a-3) SELECT DEVICE LINK PROFILE
(a-3-2) SELECT OUTPUT COLOR SPACE IN
ADJUSTMENT TARGET COLOR SPACE
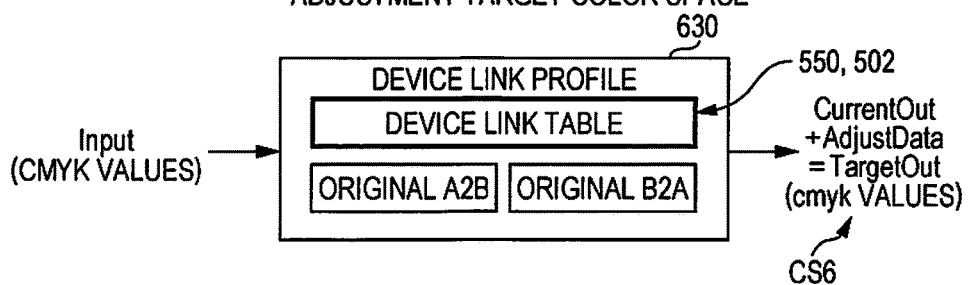

PROFILE ADJUSTMENT METHOD, AND PROFILE ADJUSTMENT SYSTEM

BACKGROUND

1. Technical Field

The present invention relates to a technology for adjusting a profile used to convert coordinate values of a color space.

2. Related Art

When an ink jet printer is used to calibrate printing such as offset printing, color reproduction precision to be requested (the degree of accurately color reproduction) is very high. As a mechanism for realizing the color reproduction precision, there is a color management system that uses an international color consortium (ICC) profile. The ICC profile is data indicating a correspondent relation between device-independent color and a device-dependent color of a color device such as a printer (for example, an offset printer) or an ink jet printer. The device-dependent color of a printer or an ink jet printer is expressed by, for example, CMYK values indicating use amounts of cyan (C), magenta (M), yellow (Y), and black (K). The device-dependent color is expressed by, for example, saturation values of a CIE (International Commission on Illumination) L*a*b color space ("*" is omitted and Lab values are used) or saturation values of a CIE XYZ color space which is a device-independent color space.

Here, an ICC profile of a printer is referred to as an input profile and an ICC profile of an ink jet printer is referred to as an output profile. When CMYK values (referred to as $CMYK_t$ values) in a printer are converted into saturation values (for example, Lab values) of a profile connection space (PCS) according to an input profile, the saturation values can be converted into CMYK values (referred to as $CMYK_p$ values) of the ink jet printer according to an output profile. When printing is executed by an ink jet printer according to the $CMYK_p$ values, colors close to colors of a printer can be reproduced with the ink jet printer. Actually, expected colors may not be reproduced due to an error of a profile, a color measurement error, a variation in a printer, or the like in some cases. In these cases, conversion precision of target colors is improved by correcting the ICC profile.

JP-A-2006-174371 discloses spot color adjustment of a printer profile. In the spot color adjustment, a profile used for color matching is stored in a profile storage unit and a spot correction table is stored in a spot correction table storage unit different from the profile storage unit.

However, since the profile storage unit and the spot correction table storage unit are separately prepared, there is a possibility of the profile and the spot correction table being incorrectly associated with each other. When the profile and the spot correction table are incorrectly associated, adjustment of the profile may not be intended adjustment.

The above-described problem is not limited to an adjustment case of a profile targeting an ink jet printer and may also arise even when a profile targeting various color devices is adjusted.

SUMMARY

An advantage of some aspects of the invention is that it provides a technology for improving convenience of work for adjusting a profile to be used to convert coordinate values of a color space.

According to an aspect of the invention, there is provided a profile adjustment method of adjusting a correspondent relation between coordinate values of an input color space and coordinate values of an output color space. The profile adjustment method includes: storing history information indicating adjustment content of a first table defining the correspondent relation in a first profile at a private tag of the first profile; reading the history information from the private tag of the first profile; and using the read history information for at least one of readjustment of the first table and adjustment of a second table defining the correspondent relation in a second profile.

According to another aspect of the invention, there is provided a profile adjustment method including: reading history information indicating adjustment content at one or more adjustment points corresponding to an adjustment target color in a profile defining a correspondent relation between coordinate values of an input color space and coordinate values of an output color space from a storage region; accepting the adjustment point as a specific point so that readjustment is not executed among the one or more adjustment points included in the read history information; and readjusts the profile so that the readjustment is not executed at the specific point.

According to still another aspect of the invention, there is provided a profile adjustment program causing a computer to realize functions corresponding to the steps of the above-described profile adjustment method.

According to an aspect of the invention, there is provided a profile adjustment system including units corresponding to the steps of the above-described profile adjustment method.

In this case, it is possible to provide a technology for improving convenience of work for adjusting a profile to be used to convert coordinate values of a color space.

BRIEF DESCRIPTION OF THE DRAWINGS

The invention will be described with reference to the accompanying drawings, wherein like numbers reference like elements.

FIG. 3 is a diagram schematically illustrating examples of relations of various profiles.

FIG. 13A is a diagram schematically illustrating a structure example of history information stored in a private tag of a profile.

FIG. 13B is a diagram schematically illustrating an example of a user interface screen.

FIG. 13C is a diagram schematically illustrating a structure example of history information when a table of the profile is returned before adjustment.

FIG. 14A is a diagram schematically illustrating an example of a user interface screen.

FIG. 14B is a diagram schematically illustrating an example of a target acceptance region when a specific point is designated.

FIGS. 19A to 19E are diagrams schematically illustrating calculation examples of current output values.

FIG. 20 is a diagram schematically illustrating an example of an expression for calculating current output values.

FIGS. 21A to 21D are diagrams schematically illustrating a calculation example of target output values according to an adjustment target color space.

FIGS. 22A to 22C are diagrams schematically illustrating a calculation example of target output values according to an adjustment target color space.

FIG. 23 is a diagram schematically illustrating an example of an expression for calculating target output values.

FIG. 25 is a diagram schematically illustrating an expression for calculating input values and adjustment target values of an adjustment target profile.

FIG. 28 is a diagram schematically illustrating an example of a gradation image.

FIG. 29 is a diagram schematically illustrating an example in which history information is utilized in a table of another form profile.

DESCRIPTION OF EXEMPLARY EMBODIMENTS

Figure 1:
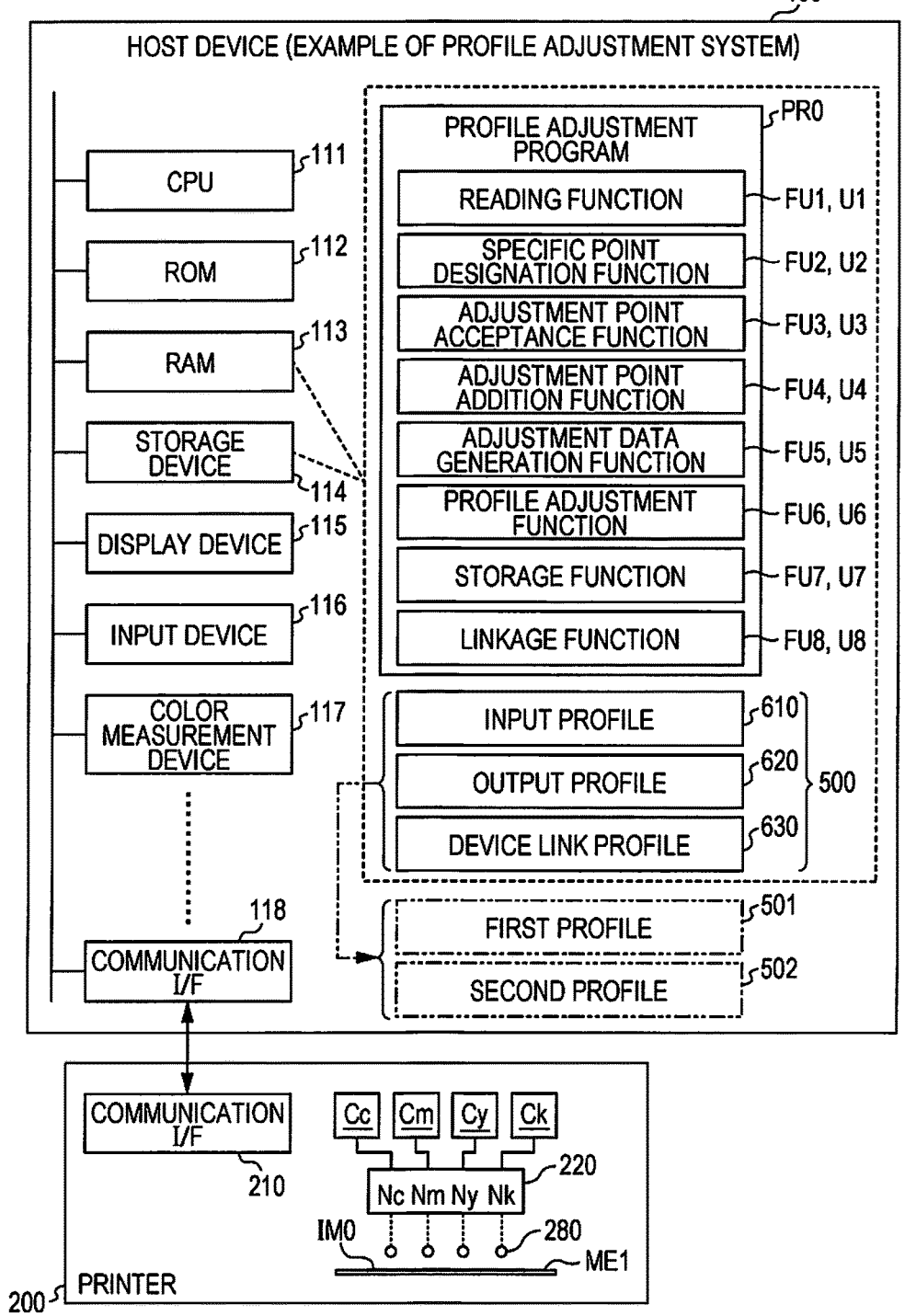
FIG. 1 is a block diagram schematically illustrating a configuration example of a profile adjustment system.

Hereinafter, embodiments will be described. Of course, the following embodiments are merely examples of the invention and all the characteristics described in the embodiments are not necessarily resolutions of the invention.

(1) Overview of Technology Included in Invention

First, an overview of a technology included in the invention will be described with reference to examples illustrated in FIGS. 1 to 30. The drawings in the present specification are drawings schematically illustrating the examples and magnifications in each direction illustrated in the drawings are different in some cases, and thus each drawing is not consistent in some cases. Of course, elements of the present technology are not limited to specific examples denoted by reference numerals.

Aspect 1

According to an aspect of the technology, a profile adjustment method is a profile adjustment method of adjusting a correspondent relation between coordinate values of an input color space CS4 and coordinate values of an output color space CS5 and includes a storage step ST7, a reading step ST1, and a profile adjustment process ST6. In the storage step ST7, history information 700 indicating adjustment content of a first table 511 defining the correspondent relation in a first profile 501 is stored at a private tag 523 of the first profile 501. In the reading step ST1, the history information 700 is read from the private tag 523 of the first profile 501. In the profile adjustment step ST6, the read history information 700 is used for at least one of readjustment of the first table 511 and adjustment of a second table 512 defining the correspondent relation in a second profile 502.

In the foregoing Aspect 1, since the history information 700 is stored in the private tag 523 of the profile, the relation between an adjustment target table and the history information 700 is maintained. When the table of the profile is readjusted, an unintended change in color is suppressed, and consequently a reattempt of adjustment work due to an operation mistake is suppressed. When another table is adjusted, the adjustment work is consequently saved. Accordingly, this aspect can provide the profile adjustment method capable of improving convenience of work for adjusting the profile used to convert the coordinate values of the color space.

Here, the input color space includes a CMYK color space, a CMY color space, an RGB color space, a CIE Lab color space, and a CIE XYZ color space. R stands for red, G stands for green, and B stands for blue.

The output color space also includes a CMYK color space, a CMY color space, an RGB color space, a CIE Lab color space, and a CIE XYZ color space.

The reading of the history information from the private tag may be reading of the whole profile including the table or may be reading of only history information in the profile.

The additional remarks of the foregoing Aspect 1 are the same in the following aspects.

Aspect 2

Figure 11:
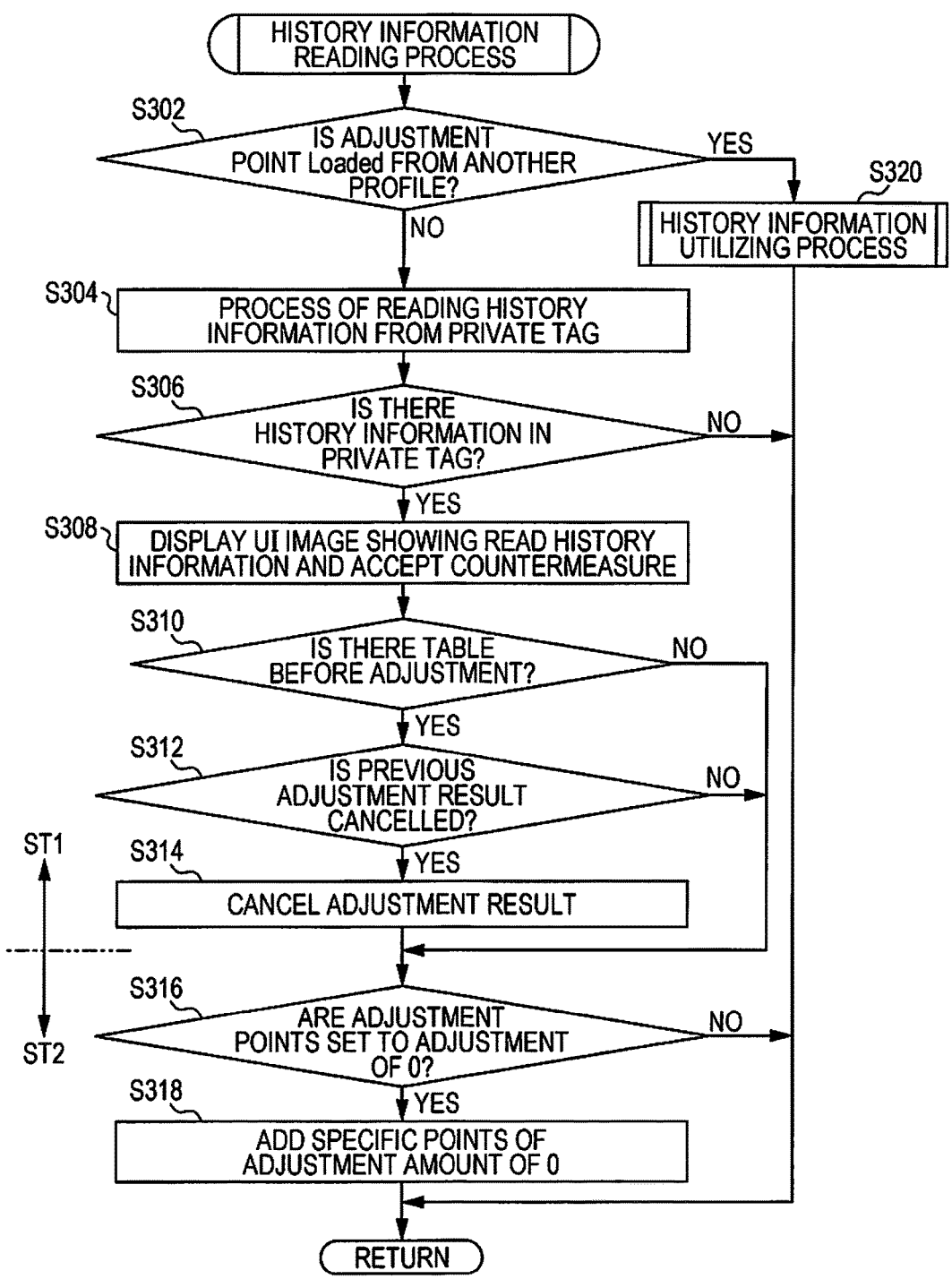
FIG. 11 is a flowchart illustrating an example of a history information reading process.

As exemplified in FIGS. 11, 14A, and 14B, the history information 700 may express adjustment content (for example, a target T0 and an adjustment range A0) at one or more adjustment points P0 corresponding to an adjustment target color. In the profile adjustment method, the adjustment point P0 may be accepted as a specific point SP so that readjustment is not executed among the one or more adjustment points P0 included in the history information 700 read in the reading step ST1. In the profile adjustment step ST6, the first table 511 is readjusted so that the readjustment is not executed at the specific point SP.

In the foregoing Aspect 2, a user can set the specific point SP so that the readjustment is not executed among the one or more adjustment points P0 included in the read history information 700. Accordingly, this aspect can provide a technology for further improving the convenience of the work for readjusting the profile.

Although not included in the foregoing Aspect 2, a case in which no specific point is accepted is also included in the technology.

Aspect 3

Figure 12:
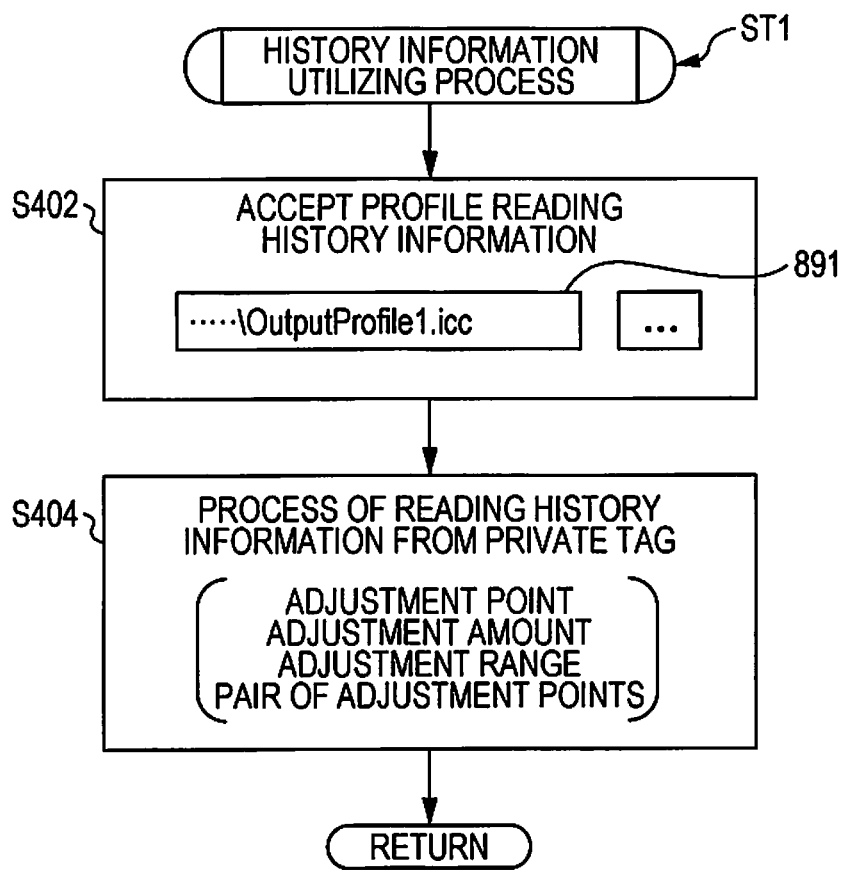
FIG. 12 is a flowchart illustrating an example of a history information utilizing process.

As exemplified in FIGS. 11 and 12, the specific point SP may not be accepted in a specific point designation step ST2 when the second table 512 is adjusted in the profile adjustment step ST6. When the history information 700 of the first table 511 of the first profile 501 is used to adjust the second table 512 of the second profile 502, the degree of adjustment at the adjustment point P0 may be changed between the first table 511 and the second table 512. Accordingly, this aspect can provide a technology for suppressing a reattempt of work when the profile is adjusted.

Aspect 4

Figure 6:
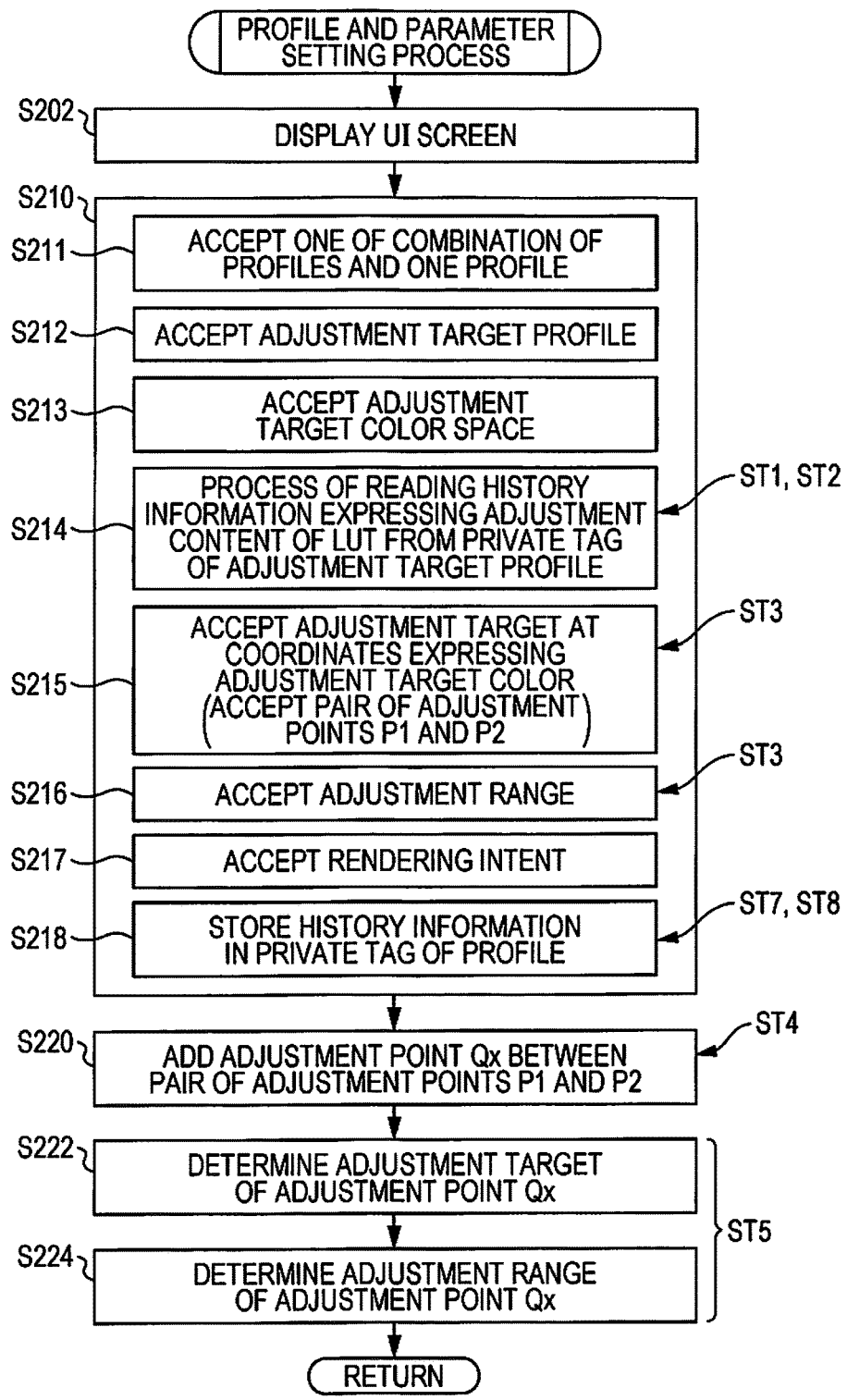
FIG. 6 is a flowchart illustrating an example of a profile and parameter setting process.
Figure 7:
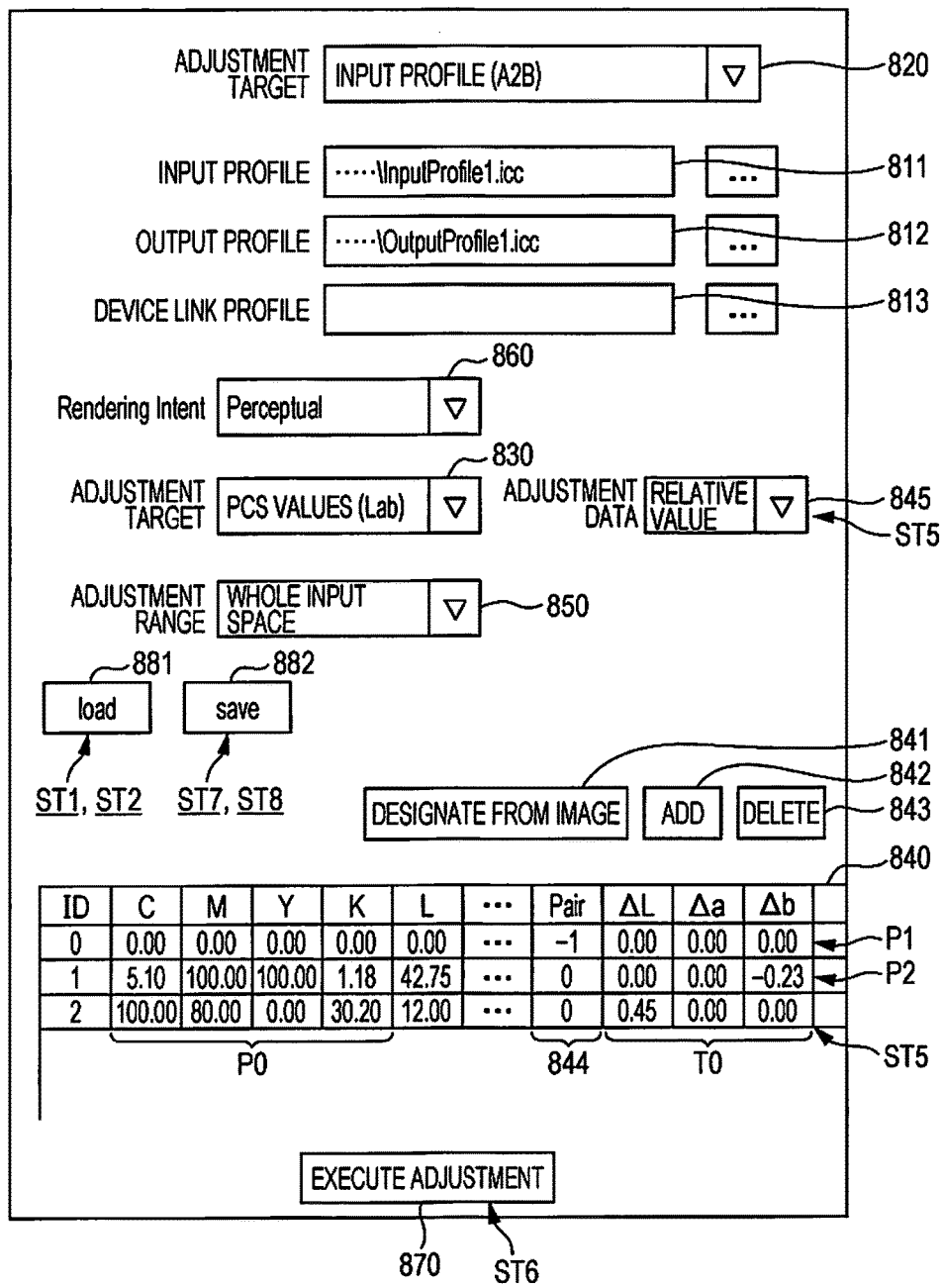
FIG. 7 is a diagram schematically illustrating an example of a user interface screen.

As exemplified in FIGS. 6, 7, and the like, the profile adjustment method may further include an adjustment point acceptance step ST3 of accepting correction of the adjustment content at the adjustment point P0 included in the history information 700 read in the reading step ST1, addition of the new adjustment point P0 corresponding to the adjustment target color, and setting of the adjustment content at the added adjustment point P0. In the profile adjustment step ST6, at least one of the readjustment of the first table 511 and the adjustment of the second table 512 may be executed based on the adjustment point P0 included in the read history information 700 and the adjustment content at the added adjustment point P0. Since the adjustment content at the adjustment point P0 included in the history information 700 can be corrected and the new adjustment P0 can be added, this aspect can provide the technology for further improving convenience of the work for adjusting the profile.

Aspect 5

As exemplified in FIG. 13A and the like, the history information 700 may include a plurality of items (for example, items (A) to (H)). As exemplified in FIG. 15 and the like, in the storage step ST7, designation of an item to be stored among the plurality of items may be accepted and the item of which the designation is accepted may be stored in the private tag 523. Since the item to be stored in the private tag 523 can be designated among the plurality of items of the history information 700, this aspect can provide the technology for further improving convenience of the work for adjusting the profile while realizing a reduction in the size of the history information 700.

Aspect 6

As exemplified in FIG. 13A and the like, the history information 700 includes one or more items among (A) to (H) below, (A) coordinates of the adjustment joint P0 corresponding to the adjustment target color, (B) an adjustment target T0 at the adjustment point P0, (C) information which table an adjustment target table is among a link profile (630) in which first coordinate values (for example, CMYK values) of a first color space CS1 (for example, a CMYK color space) are associated with second coordinate values (for example, cmyk values) of a second color space CS2 (for example, a cmyk color space), an input profile 610 in which the first coordinate values are associated with third coordinate values (for example, Lab values) of a profile connection space CS3 (for example, an Lab color space), and an output profile 620 in which the third coordinate values are associated with the second coordinate values, (D) an adjustment range A0 in which the adjustment point P0 is set as a base point, (E) a combination of first coordinates and second coordinates for setting a third adjustment point Q at third coordinates based on a first adjustment point P1 at the first coordinates and a second adjustment point P2 at the second coordinates, (F) a file name of a third profile combined with the first profile 501 in conversion from the first coordinate values to the second coordinate values, (G) an update date of the third profile, and (H) an original table before adjusting the first table 511.

This Aspect 6 can provide the technology for further improving convenience of the work for adjusting the profile.

Here, the coordinates (first, second, and third coordinates) of the adjustment points (the first, second, and third adjustment points) may be coordinates of the input color space, may be coordinates of the output color space, or may be coordinates of a color space different from the input color space and the output color space. The plurality of second adjustment points may be set for the first adjustment point or the plurality of first adjustment points may be set for the second adjustment point.

The adjustment target may be expressed with the coordinate values of the color space or may be expressed with a difference from the current coordinate values of the color space.

The additional remarks of the foregoing Aspect 6 are the same in the following aspects.

Aspect 7

Figure 15:
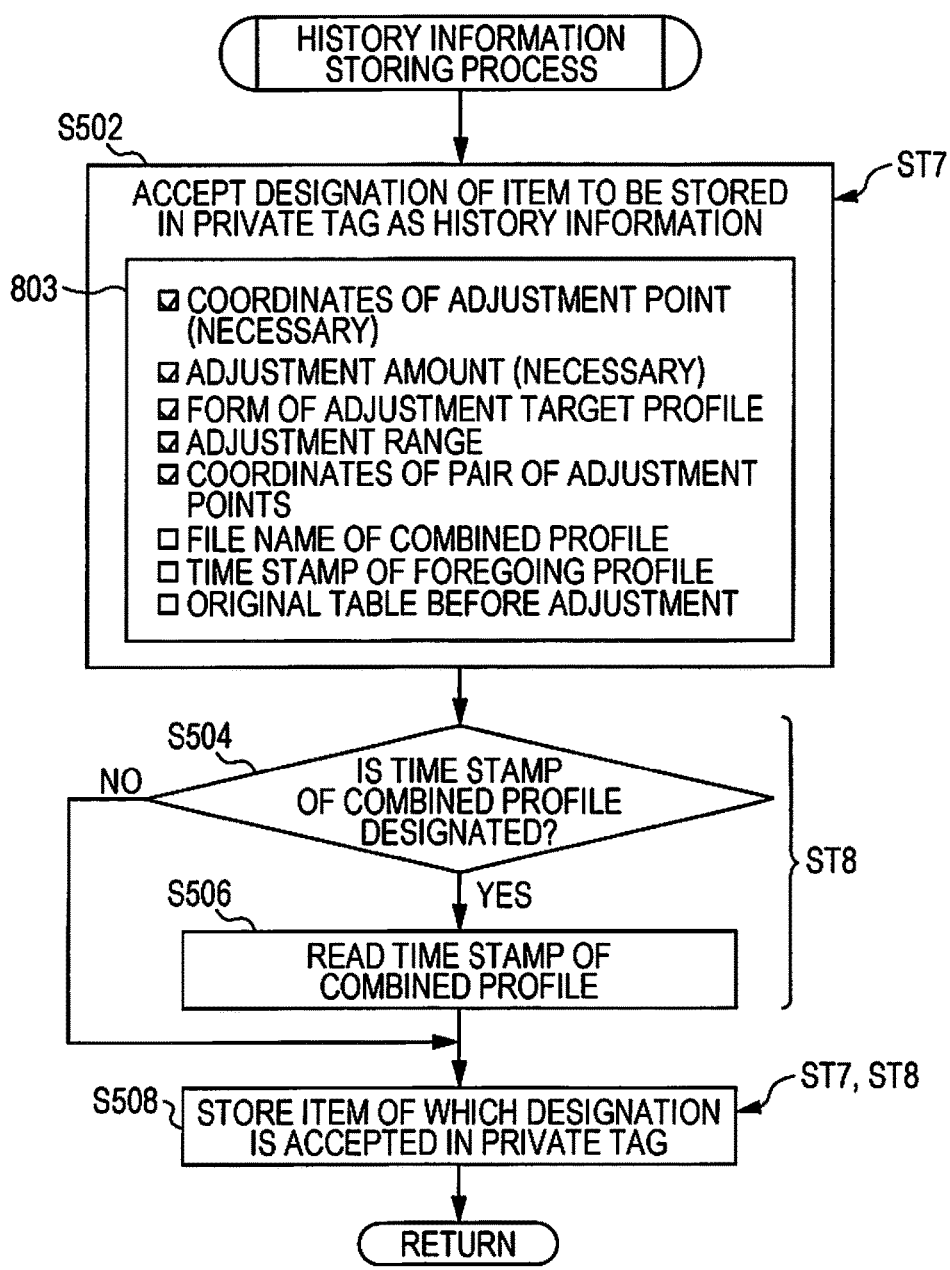
FIG. 15 is a flowchart illustrating an example of a history information storing process.

As exemplified in FIG. 15, the profile adjustment method may further include a linkage step ST8 of storing an update date of a third profile combined with the first profile 501 in the private tag 523 of the first profile 501 in conversion from the first coordinate values (for example, the CMYK values) of the first color space CS1 (for example, the CMYK color space) to the second coordinate values (for example, the cmyk values) of the second color space CS2 (for example, the cmyk color space). As exemplified in FIG. 30, in the profile adjustment step ST6, the read history information 700 may not be used for the readjustment of the first table 511 when an update date stored in the private tag of a profile combined with the third profile is different the update date of the third profile. In this case, there is a possibility of the read profile not being the combination with the third profile.

Accordingly, this aspect can provide the technology for suppressing a reattempt of work when the profile is adjusted.

In the following embodiment, the second color space is notated as the cmyk color space to distinguish the second color space from the CMYK color space which is the first color space when the second color space is the CMYK color space.

Aspect 8

As exemplified in FIG. 13A and the like, the history information 700 includes an original table before adjusting the first table 511. As exemplified in FIG. 11 and the like, in the reading step ST1, a cancellation instruction to return the first table 511 to the original table may be accepted. In the profile adjustment step ST6, the first table 511 may be returned to the original table when the cancellation instruction is accepted. This aspect can provide the technology for further improving convenience of the work for adjusting the profile since it is easy to execute the reattempt to adjust the first table 511.

Aspect 9

As exemplified in FIG. 13A and the like, the history information 700 may include coordinates of the adjustment point P0 corresponding to the adjustment target color. As exemplified in FIGS. 6, 7, and the like, the profile adjustment method may further include an adjustment point acceptance step ST3 of accepting correction of adjustment content at the adjustment point P0 included in the history information 700 read in the reading step ST1. In the profile adjustment step ST6, the second table 512 may be adjusted based on the adjustment content at the adjustment point P0 included in the read history information 700. This aspect can provide the technology for further improving convenience of the work for adjusting the profile since it is easy to set the adjustment point P0 of the second table 512.

Aspect 10

As exemplified in FIG. 13A and the like, the history information 700 may include the adjustment range A0 in which the adjustment point P0 corresponding to the adjustment target color is set as a base point. In the profile adjustment step ST6, the second table 512 may be adjusted in the adjustment range A0 when the second table 512 is adjusted. This aspect can provide the technology for further improving convenience of the work for adjusting the profile since it is easy to set the adjustment range A0 of the second table 512.

Aspect 11

The history information 700 may include the first adjustment point P1 at the first coordinates, the second adjustment point P2 at the second coordinates, and first adjustment data (for example, the first target T1 and the first adjustment range A1) indicating the degree of adjustment at the first adjustment point P1, and second adjustment data (for example, a second target T2 and a second adjustment range A2) indicating the degree of adjustment at the second adjustment point P2. As exemplified in FIGS. 6, 18A, 18B, and the like, the profile adjustment method may further include an adjustment point addition step ST4 of setting the third adjustment point Q at third coordinates based on the first coordinates and the second coordinates. The profile adjustment method may further include an adjustment data generation step ST5 of generating third adjustment data (for example, a third target T3 and a third adjustment range A3) indicating the degree of adjustment at the third adjustment point Q based on the first adjustment data and the second adjustment data. In the profile adjustment step ST6, the second table 512 may be adjusted based on the first adjustment data, the second adjustment data, and the third adjustment data.

In the foregoing Aspect 11, when the history information 700 includes the first adjustment point P1 at the first coordinates and the second adjustment point P2 at the second coordinates, the third adjustment point Q at the third coordinates is automatically set. Further, the third adjustment data indicating the degree of adjustment at the third adjustment point Q is generated. The third adjustment data is also used to adjust the second table 512 of the second profile 502. Accordingly, this aspect can provide a technology for easily improving a gradation property of an output image with reference to the second profile.

Here, the adjustment data (the first adjustment data, the second adjustment data, and the third adjustment data) includes the adjustment target at the adjustment point and the adjustment range in which the adjustment point is set as the base point.

Aspect 12

A form of the first profile 501 may be one of a link profile (for example, a device link profile 630) in which first coordinate values (for example, the CMYK values) of the first color space CS1 (for example, the CMYK color space) are associated with the second coordinate values (for example, the cmyk values) of the second color space CS2 (for example, the cmyk color space), the input profile 610 in which the first coordinate values are associated with third coordinate values (for example, the Lab values) of the profile connection space CS3 (for example, the Lab color space), and the output profile 620 in which the third coordinate values are associated with the second coordinate values. A form of the second profile 502 is one of the link profile (630), the input profile 610, and the output profile 620. This aspect can provide the preferred technology for improving convenience of the work for adjusting the profile.

Aspect 13

Incidentally, a profile adjustment method according to another aspect of the technology includes the reading step ST1, the specific point designation step ST2, and the profile adjustment step ST6. In the reading step ST1, the history information 700 indicating adjustment content at one or more adjustment points P0 corresponding to an adjustment target color in a profile 500 defining a correspondent relation between coordinate values of the input color space CS4 and coordinate values of the output color space CS5 is read from a storage region (for example, the private tag 523). In the specific point designation step ST2, the adjustment point P0 is accepted as the specific point SP so that readjustment is not executed among the one or more adjustment points P0 included in the read history information 700. In the profile adjustment step ST6, the profile 500 is readjusted so that the readjustment is not executed at the specific point SP.

In the foregoing Aspect 13, the user can set the specific point SP so that the readjustment is not executed among one or more adjustment points P0 included in the read history information 700. Accordingly, this aspect can provide the profile adjustment method capable of improving convenience of work for adjusting the profile used to convert the coordinate values of the color space.

Aspect 14

According to an aspect of the technology, a profile adjustment program PR0 causes a computer to realize functions corresponding to the steps of Aspect 1, that is, a storage function FU7 corresponding to the storage step ST7, a reading function FU1 corresponding to the reading step ST1, and a profile adjustment function FU6 corresponding to the profile adjustment process ST6. This aspect can provide a profile adjustment program improving convenience of the work for adjusting the profile used to convert the coordinate values of the color space. The profile adjustment program PR0 may cause a computer to realize a specific point designation function FU2 corresponding to the specific point designation step ST2, an adjustment point acceptance function FU3 corresponding to the adjustment point acceptance step ST3, a linkage function FU8 corresponding to the linkage step ST8, an adjustment point addition function FU4 corresponding to the adjustment point addition step ST4, and an adjustment data generation function FU5 corresponding to the adjustment data generation step ST5.

Aspect 15

According to another aspect of the technology, the profile adjustment program PR0 causes a computer to realize functions corresponding to the steps of Aspect 13, that is, the reading function FU1 corresponding to the reading step ST1, the specific point designation function FU2 corresponding to the specific point designation step ST2, and the profile adjustment function FU6 corresponding to the profile adjustment process ST6. This aspect can provide the profile adjustment program improving convenience of the work for adjusting the profile used to convert the coordinate values of the color space.

Aspect 16

According to an aspect of the technology, a profile adjustment system (for example, a host device 100) includes units corresponding to the steps of Aspect 1, that is, a storage unit U7 corresponding to the storage step ST7, a reading unit U1 corresponding to the reading step ST1, and a profile adjustment unit U6 corresponding to the profile adjustment process ST6. This aspect can provide a profile adjustment system improving convenience of the work for adjusting the profile used to convert the coordinate values of the color space. The profile adjustment system may include a specific point designation unit U2 corresponding to the specific point designation step ST2, an adjustment point acceptance unit U3 corresponding to the adjustment point acceptance step ST3, a linkage unit U8 corresponding to the linkage step ST8, the adjustment point addition unit U4 corresponding to the adjustment point addition step ST4, and an adjustment data generation unit U5 corresponding to the adjustment data generation step ST5.

Aspect 17

Further, according to another aspect of the technology, a profile adjustment system (for example, the host device 100) includes units corresponding to the steps of Aspect 13, that is, the reading unit U1 corresponding to the reading step ST1, the specific point designation unit U2 corresponding to the specific point designation step ST2, and the profile adjustment unit U6 corresponding to the profile adjustment process ST6. This aspect can provide the profile adjustment system improving convenience of the work for adjusting the profile used to convert the coordinate values of the color space.

Further, the technology can be applied to a method of controlling the profile adjustment system, a complex system including the profile adjustment system, a method of controlling the complex system, a program controlling the profile adjustment system, a program controlling the complex system, a profile adjustment program, and a computer-readable medium recording the control program. The above-described device may be configured with a plurality of distributed portions.

(2) Specific Example of Profile Adjustment System

FIG. 1 schematically illustrates the host device 100 as a configuration example of the profile adjustment system. In the host device 100, a central processing unit (CPU) 111, a read-only memory (ROM) 112, a random access memory (RAM) 113, a storage device 114, a display device 115, an input device 116, a color measurement device 117, a communication interface (I/F) 118, and the like are connected to each other so information can be mutually input and output.

The storage device 114 stores an operating system (OS) (not illustrated), a profile adjustment program PR0, and the like. The operating system, the profile adjustment program PR0, and the like are appropriately read to the RAM 113 to be used for adjustment process for a profile 500. Here, the profile 500 is a generic term of an input profile 610, an output profile 620, and a device link profile 630. In the specific example, a first profile 501 and a second profile 502 are selected form the profiles 610, 620, and 630. At least one of the RAM 113 and the storage device 114 stores various kinds of information, for example, the input profile 610, the output profile 620, the device link profile 630, and adjustment history information 700. A nonvolatile semiconductor memory such as a flash memory or a magnetic storage device such as a hard disk can be used as the storage device 114.

A liquid crystal panel or the like can be used as the display device 115. A pointing device, a hard key including a keyboard, a touch panel attached on the surface of a display panel, or the like can be used as the input device 116. The color measurement device 117 can measure each color patch formed on a print substrate which is an example of a medium on which a color chart is formed and can output the color measurement values. The patch is also called a color chart. Color measurement values are considered as, for example, values indicating lightness L and chromaticity coordinates a and b in a CIE Lab color space. The color measurement device 117 may be installed out of the host device 100. The host device 100 acquires color measurement data including a plurality of color measurement values from the color measurement device 117 and executes various processes. The communication I/F 118 is connected to a communication I/F 210 of a printer 200 and inputs and outputs information such as printing data to the printer 200. As the standard of the communication I/F 118 and the communication I/F 210, a universal serial bus (USB), a short-range radio communication standard, or the like can be used. The communication of the communication I/F 118 and the communication I/F 210 may be wired or wireless or may be network communication such as a local area network (LAN) or the Internet.

The profile adjustment program PR0 illustrated in FIG. 1 causes the host device 100 to realize the reading function FU1, the specific point designation function FU2, the adjustment point acceptance function FU3, the adjustment point addition function FU4, the adjustment data generation function FU5, the profile adjustment function FU6, the storage function FU7, and the linkage function FU8.

The host device 100 includes a computer such as a personal computer (including a tablet terminal). The host device 100 may include all the constituent elements 111 to 118 within a single casing and may also be configured as a plurality of devices separated to be able to communicate with each other. Even when the printer is the host device 100, the technology can be embodied.

The printer 200 illustrated in FIG. 1 is assumed to be an ink jet printer that ejects (discharges) cyan (C) ink, magenta (M) ink, yellow (Y) ink, and black (K) ink as color materials from a recording head 220 and form an output image IM0 corresponding to printing data. When ink of cyan, magenta, yellow, and black (CMYK) is supplied from ink cartridges Cc, Cm, Cy, and Ck, respectively, the recording head 220 ejects ink droplets 280 of CMYK from nozzles Nc, Nm, Ny, and Nk. When the ink droplets 280 are landed on a print substrate ME1, ink dots are formed on the print substrate ME1. As a result, it is possible to obtain a printing matter that has an output image IM0 on the print substrate ME1.

(3) Specific Example of Color Management System

Next, an example of a color management system to which the technology can be applied will be described with reference to FIG. 2.

Figure 2:
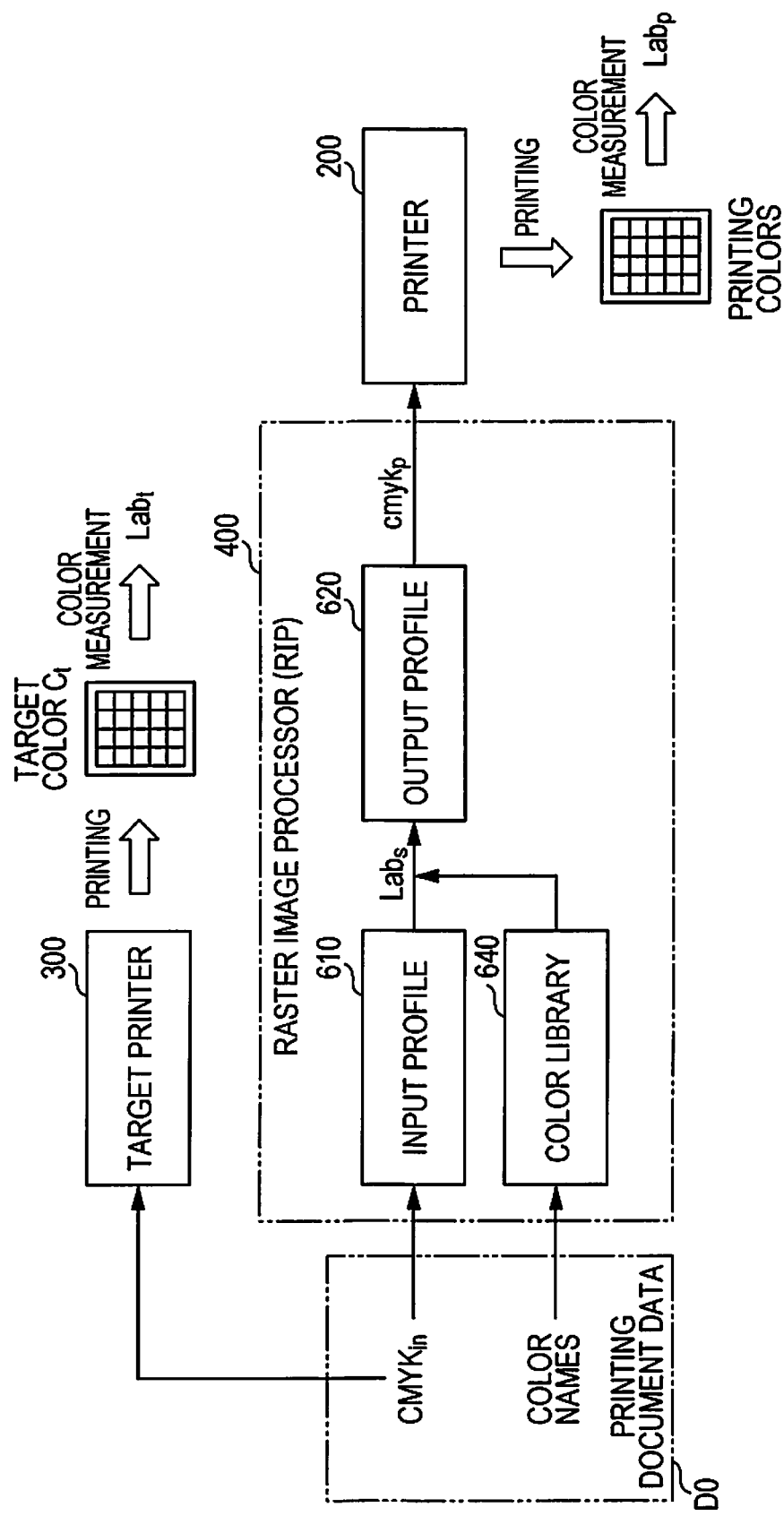
FIG. 2 is a diagram schematically illustrating an example of a color management flow.

In the color management system illustrated in FIG. 2, a raster image processor (RIP) 400 converts printing document data D0 into output data indicating printing colors cyan, magenta, yellow, and black ($cmyk_p$) and causes the ink jet printer 200 to form a printing matter. The printing document data D0 expresses process colors $CMYK_{in}$ for reproducing a targeting color (target color $C_t$) with ink (color materials) of CMYK of a target printer 300 which is an example of a color matching target device. In the printing document data D0, the names of colors of a color library can also be designated. As the color library, for example, a Pantone (registered trademark) color library can be used.

The target printer 300 is assumed to be an offset printer, but a gravure printer, a flexographic printer, or the like may be used. The target color $C_t$ is expressed with, for example, coordinate values (Lab values) of the CIE Lab color space. FIG. 2 illustrates a form in which the target printer 300 prints a color chart expressing the target color $C_t$ on a printing matter and a color measurement device measures colors of each patch of the color chart to acquire color measurement values $Lab_t$. The process colors $CMYK_{in}$ correspond to use amounts of ink of CMYK used by the target printer 300 and express coordinates of the CMYK color space which depends on the target printer 300.

The RIP 400 includes the input profile 610, the output profile 620, and a color library 640. The input profile 610 is a file that describes color characteristics of ink used by the target printer 300. The output profile 620 is a file that describes color characteristics of ink used by the ink jet printer 200. For both the profiles 610 and 620, for example, a data format of an ICC profile can be used. The process colors $CMYK_{in}$ of the printing document data D0 are converted into colors $Lab_s$ of the Lab color space according to the input profile 610 and are converted into printing colors $cmyk_p$ according to the output profile 620. When the printer 200 uses ink of a total of four colors of CMYK, the printing colors $cmyk_p$ are output to the printer 200 to be reproduced on a printing matter. FIG. 2 illustrates a form in which the printer 200 prints a color chart expressing the printing colors $cmyk_p$ on a print substrate and a color measurement device measures each patch of the color chart to acquire color measurement values $Lab_p$. When the printer 200 also uses ink such as light cyan (Lc), light magenta (Lm), dark yellow (Dy), and light black (Lk), and the RIP 400 or the printer 200 classifies the printing colors $cmyk_p$ into dark colors and light colors, the printer 200 can reproduce the printing colors $cmyk_p$ on a printing matter. Of course, the printing colors are not limited to the total of four colors of CMYK.

When the names of colors are set in the printing document data D0, the RIP 400 converts the names of the colors into the colors $Lab_s$ of the Lab color space with reference to the color library 640 in some cases.

The RIP 400 has not only the process colors $CMYK_{in}$ but also, for example, process colors expressing use amounts of color materials of only the three primary colors CMY (referred to as $CMY_{in}$) which are subtractive mixture of colors or process colors expressing intensities of the three primary colors red (R), green (G), and blue (B) (referred to as $RGB_{in}$) which are additive mixture of colors, and an input profile for converting coordinate values of the Lab color space. Accordingly, the RIP 400 can convert the process colors $CMY_{in}$ or the process colors $RGB_{in}$ into the printing colors $cmyk_p$ via the Lab color space. In addition, the RIP 400 can also input the colors $Lab_s$ of the Lab color space and convert the colors $Lab_s$ into the printing colors $cmyk_p$.

As described above, colors close to colors of the target printer 300 can be reproduced by the ink jet printer 200. However, actually, expected colors may not be reproduced due to an error of a profile, a color measurement error, a variation in a printer, or the like in some cases. In these cases, conversion precision of target colors is improved by correcting the profiles 610 and 620. When the output profile 620 is corrected, it is considered that $Lab_s$ values in a profile connection space (PCS) are set as target values, color differences between both the colors are calculated using results ($Lab_p$) obtained by measuring colors printed by the printer 200 as current values, and the output profile 620 is corrected to reduce the color differences. When the input profile 610 is corrected, it is considered that data of the color chart is converted into the input profile 610 and the output profile 620, the color chart is printed, color differences between color measurement results ($Lab_p$) of each patch and target saturation values ($Lab_t$) are calculated, and the input profile 610 is corrected to reduce the color differences.

Here, expected colors may not be obtained or it takes some time due to the following reasons.

Reason 1: Since it is necessary to measure colors of printed results, a measurement instrument is necessary and color matching countermeasure may not be taken visually.

Reason 2: When the input profile 610 is corrected, a calculation result of the color differences is fed back to the input profile 610. However, when it is considered that there is a reason of an error in the output profile 620, it is necessary to also correct another input profile. (In this case, by feeding the calculation result back to the output profile 620 and correcting the output profile 620, it is not necessary to correct another output profile.)

Reason 3: Adjustment history information is assumed to be stored in a server separately from the profile. Therefore, when association between the profile and the history information is incorrectly operated, intended adjustment is not executed in some cases.

Reason 4: History information is managed for each color. Therefore, when a plurality of points are adjusted together, an instruction of adjustment content is necessary for each color and an operation is troublesome.

In the specific example, the functions FU1 to FU8 realized by the profile adjustment program PR0 improve convenience of work for adjusting a profile used to convert coordinate values of the color space and realize further higher color reproduction precision or a gradation property.

(4) Specific Example of Profile

FIG. 3 schematically exemplifies relations between the profiles 610, 620, and 630.

As illustrated in FIG. 3, the input profile 610 is data that defines a correspondent relation between CMYK values ($C_i$, $M_i$, $Y_i$, $K_i$) of the CMYK color space (which is an example of a first color space CS1) and Lab values ($L_i$, $a_i$, $b_i$) of an Lab color space (which is an example of the profile connection space (PCS) CS3) suitable for ink used by the target printer 300. In this case, lattice points GD1 of an A2B table are normally arranged at a substantially equal interval in a C-axis direction, an M-axis direction, a Y-axis direction, and a K-axis direction in the CMYK color space. Here, the variable i is a variable for identifying the lattice points GD1 set in the CMYK color space (CS1). The CMYK values are examples of first coordinate values. The Lab values are examples of the third coordinate values. In the input profile 610, the CMYK color space (CS1) is an example of an input color space CS4 and the Lab color space (CS3) is an example of an output color space CS5.

The output profile 620 is data that defines a correspondent relation between Lab values ($L_j$, $a_j$, $b_j$) of the Lab color space (CS3) and cmyk values ($c_j$, $m_j$, $y_j$, $k_j$) of the cmyk color space (which is example of a second color space CS2) suitable for ink used by the ink jet printer 200. In this case, lattice points GD2 of a B2A table are normally arranged at a substantially equal interval in an L-axis direction, an a-axis direction, and a b-axis direction in the Lab color space. Here, the variable j is a variable for identifying the lattice points GD2 set in the Lab color space (CS3). The reason for expression as the "cmyk color space" is to distinguish a color space suitable for ink used by the printer 200 from a color space suitable for ink used by the target printer 300. The cmyk values are examples of second coordinate values. In the output profile 620, the Lab color space (CS3) is an example of an input color space CS4 and the cmyk color space (CS2) is an example of an output color space CS5.

The device link profile 630 is data that defines a correspondent relation between CMYK values ($C_i$, $M_i$, $Y_i$, $K_i$) of the CMYK color space (CS1) and cmyk values ($c_i$, $m_i$, $y_i$, $k_i$) of an cmyk color space (CS2). Here, the variable i is a variable for identifying the lattice points GD1 set in the CMYK color space (CS1). The device link profile 630 can be obtained by linking the input profile 610 and the output profile 620. In the input profile 610, the CMYK color space (CS1) is an example of an input color space CS4 and the cmyk color space (CS2) is an example of an output color space CS5.

Figure 4:
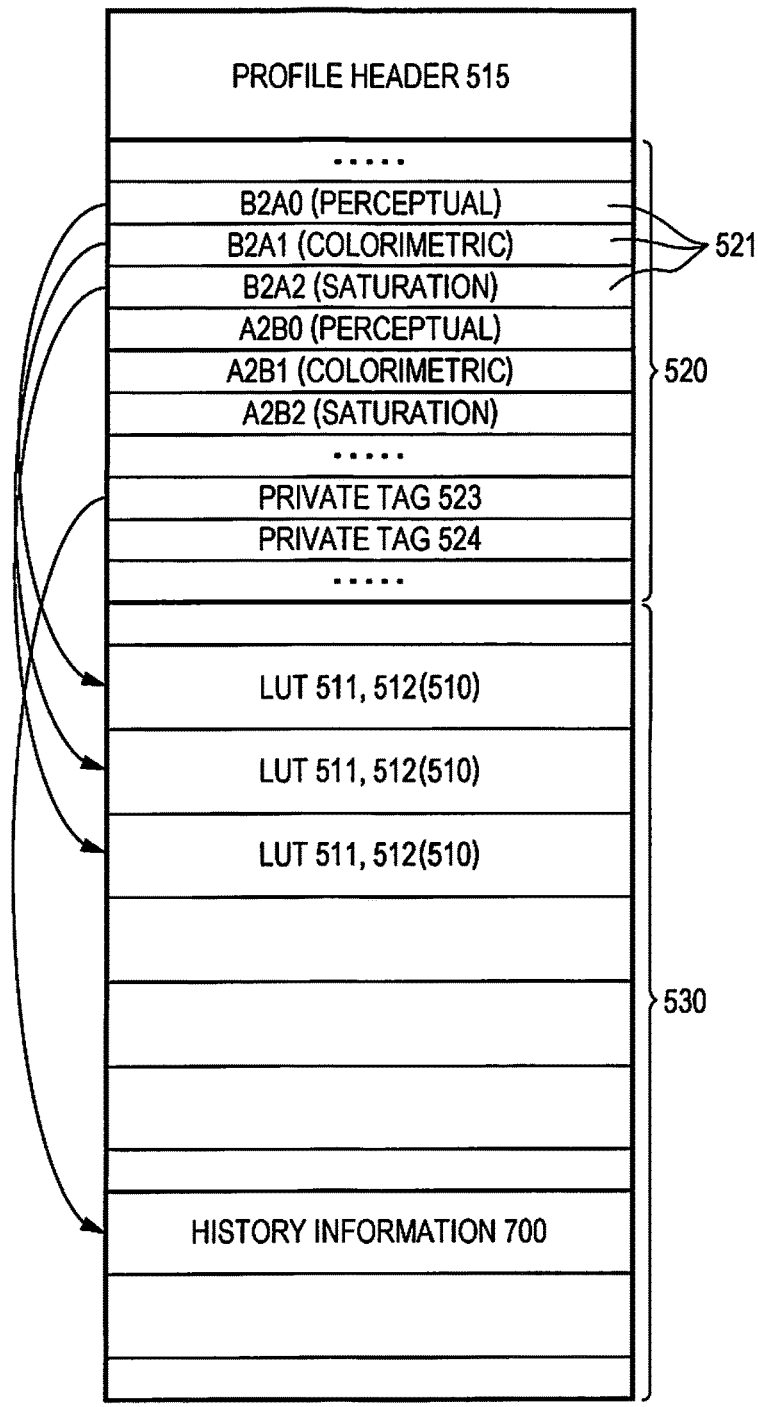
FIG. 4 is a diagram schematically illustrating a structure example of a profile.

FIG. 4 schematically exemplifies the structure of the profile 500. The profile 500 is a generic term of the first profile 501 and the second profile 502. The profile 500 illustrated in FIG. 4 is an ICC profile and includes a profile header 515 and a tag table 520. The profile 500 includes a tag 521 which is information necessary for converting color information between PCS and a device-dependent color space. The tag 521 may include private tags 523, 524, . . . (which are examples of storage regions) for customizing the profile 500. In the specific example, the description will be made by storing the history information 700 in the private tag 523.

An A2Bx tag (x is 0, 1, or 2 illustrated in FIG. 4) for the device (300 or 200) includes a color conversion table 510 which is a lookup table (LUT) for converting a device-dependent color space (the CMYK color space or the cmyk color space) into the Lab color space, as element data 530. The color conversion table 510 is a generic term of the first table 511 and the second table 512. A B2Ax tag for the device (300 or 200) includes the color conversion table 510 for converting the Lab color space into a device-dependent color space (the CMYK color space or the cmyk color space), as the element data 530.

The A2B0 tag and the B2A0 tag illustrated in FIG. 4 are information for executing perceptual color conversion. The perceptual color conversion is mainly used for conversion of a color gamut photo image since gradation reproduction is important. The A2B1 tag and the B2A1 tag illustrated in FIG. 4 are information for executing media-relative colorimetric color conversion or absolute colorimetric color conversion. The colorimetric color conversion is mainly used for color correction output conversion of a digital proof in which accurate color matching is obtained since the colorimetric color conversion is faithful to color measurement values. The A2B2 tag and the B2A2 tag illustrated in FIG. 4 are information for executing saturation color conversion. The saturation-important color conversion is mainly used for conversion of graph display or the like in business graphics since vividness of color is important rather than accuracy of shade.

Figure 5:
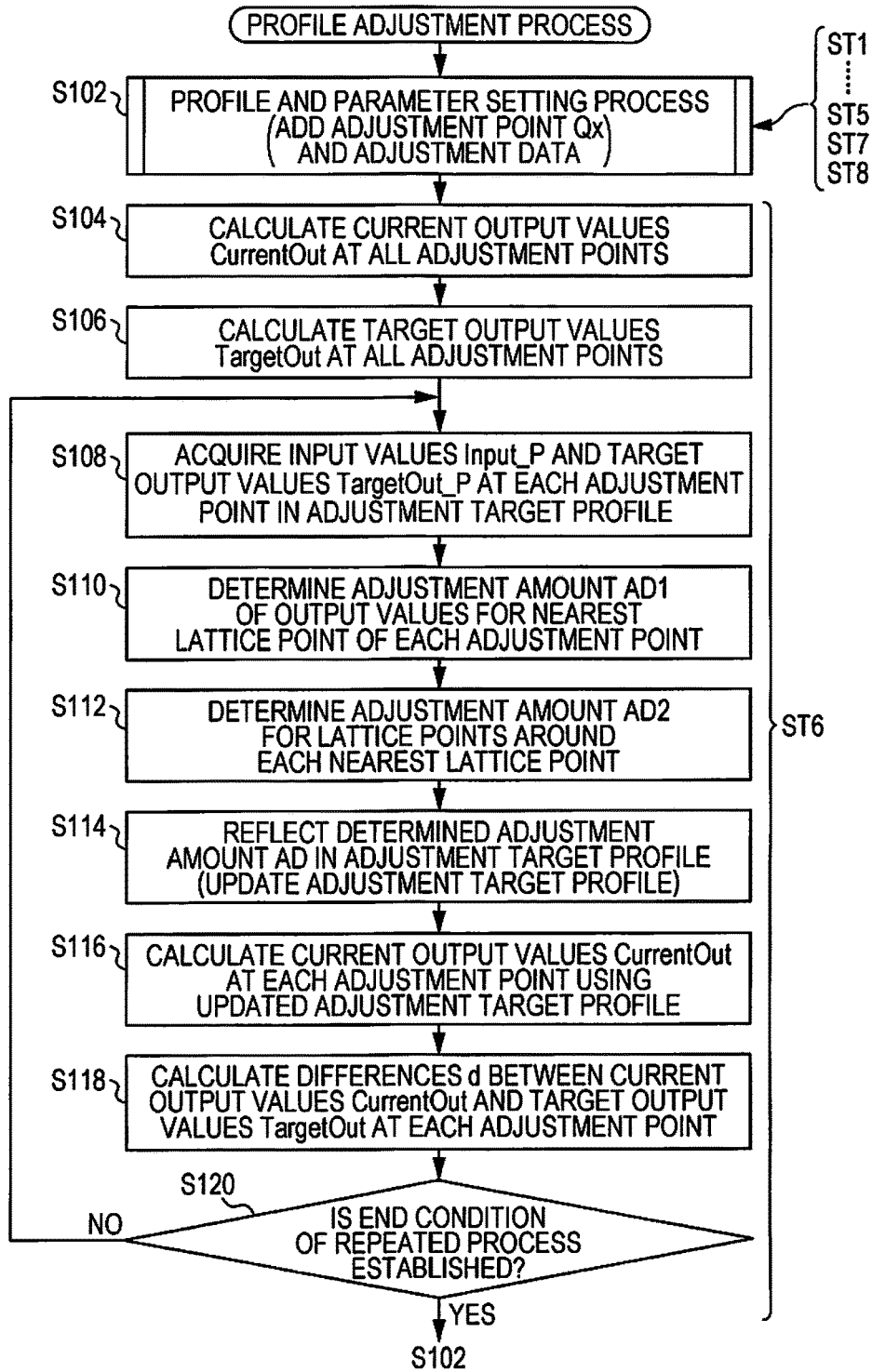
FIG. 5 is a flowchart illustrating an example of a profile adjustment process.

(5) Specific Example of Profile Adjustment Process Executed in Profile Adjustment System FIG. 5 illustrates an example of the profile adjustment process executed in the host device 100 illustrated in FIG. 1. FIG. 6 illustrates an example of a profile and parameter setting process executed in step S102 of FIG. 5. Of course, these processes can be appropriately changed by changing the order of the processes. FIG. 7 illustrates an example of a user interface (UI) screen 800 displayed in step S202 of FIG. 6. The host device 100 executes a plurality of processes in parallel by multitasking. Here, step S214 of FIG. 6 corresponds to the reading step ST1, the specific point designation step ST2, the reading function FU1, the specific point designation function FU2, the reading unit U1, and the specific point designation unit U2. Steps S215 and S216 of FIG. 6 correspond to the adjustment point acceptance step ST3, the adjustment point acceptance function FU3, and the adjustment point acceptance unit U3. Step S218 of FIG. 6 corresponds to the storage step ST7, the linkage step ST8, the storage function FU7, the linkage function FU8, the storage unit U7, and the linkage unit U8. Step S220 of FIG. 6 corresponds to the adjustment point addition step ST4, the adjustment point addition function FU4, and the adjustment point addition unit U4. Steps S222 and S224 of FIG. 6 correspond to the adjustment data generation step ST5, the adjustment data generation function FU5, and the adjustment data generation unit U5. Steps S104 to S120 of FIG. 5 correspond to the profile adjustment step ST6, the profile adjustment function FU6, and the profile adjustment unit U6. Hereinafter, the term "step" will be omitted.

When the profile adjustment process illustrated in FIG. 5 starts, the host device 100 executes the profile and parameter setting process illustrated in FIG. 6 (S102). When the profile and parameter setting process starts, the host device 100 displays a UI screen 800 illustrated in FIG. 7 on the display device 115 (S202 of FIG. 6). The UI screen 800 includes an input profile selection field 811, an output profile selection field 812, a device link profile selection field 813, an adjustment target profile designation field 820, an adjustment target color space selection field 830, a target acceptance region 840, a button 841 of "designate from image", an addition button 842, a deletion button 843, an adjustment data selection field 845, an adjustment range designation field 850, an intent designation field 860, an adjustment execution button 870, a history load button 881, and a history save button 882.

The host device 100 ends the profile and parameter setting process when the input device 116 accepts an operation on the above-described fields and the buttons (S210) and an operation on the adjustment execution button 870 is accepted. The process of S210 includes the following processes S211 to S218:

(S211) a process of accepting selection of one of a combination of the profiles to be used for the change from the CMYK values to the cmyk values and one profile which is an adjustment target profile 550 to be used for the conversion from the CMYK values to the cmyk values;

(S212) a process of receiving one of the profiles 610, 620, and 630 as the adjustment target profile 550;

(S213) a process of accepting one of two or more kinds of color spaces among the CMYK color space (CS1), the cmyk color space (CS2), and the Lab color space (CS3) as an adjustment target color space CS6;

(S214) a process of reading the history information 700 expressing the adjustment content of the LUT (510) from the private tag 523 of the adjustment target profile 550 (included in the profile 500);

(S215) a process of accepting an input of the adjustment target T0 at coordinates expressing the adjustment point P0 (which is an example of the adjustment target color);

(S216) a process of accepting designation of an adjustment range in which a profile is adjusted based on the target T0 is the adjustment target profile 550 in the CMYK color space (CS1);

(S217) a process of accepting one of a plurality of rendering intents for defining a correspondent relation of the adjustment target profile 550 as a designated intent; and (S218) a process of storing the history information 700 in the private tag 523 of the profile 500.

First, the process of S211 will be described with reference to FIGS. 7, 8A to 8D, and 19A to 19E. Here, a component surrounded by a thick line in FIGS. 19A to 19E indicates the adjustment target profile 550. In the device link profile 630 illustrated in FIG. 19C, an adjustment target is a device link table, an "original A2B" indicates an original input profile, and an "original B2A" indicates an output profile.

The host device 100 accepts an operation of selecting a profile from the profiles 500 stored in the storage device 114 when the input device 116 accepts an operation on the selection fields 811 to 813.

In the input profile selection field 811, an input profile to be used for color conversion can be selected from the input profile 610 stored in the storage device 114 when the input profile 610 is used for the color conversion. When the input profile 610 is not used for the color conversion, the input profile selection field 811 may be set as a blank.

In the output profile selection field 812, an output profile to be used for the color conversion can be selected in the output profile 620 stored in the storage device 114 when the output profile 620 is used for the color conversion. When the output profile 620 is not used for the color conversion, the output profile selection field 812 may be set as a blank.

In the device link profile selection field 813, a device link profile to be used for the color conversion can be selected in the device link profile 630 stored in the storage device 114 when the device link profile 630 is used for the color conversion. When the device link profile 630 is not used for the color conversion, the device link profile selection field 813 may be set as a blank.

Figure 8A:
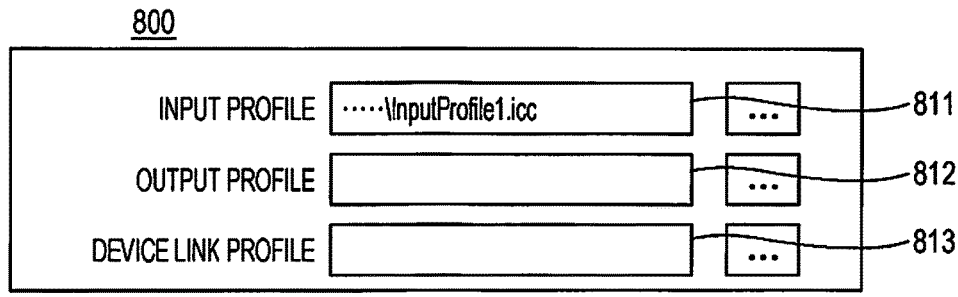
FIGS. 8A to 8D are diagrams schematically illustrating examples in which one of a profile combination and one profile is accepted.
Figure 8B:
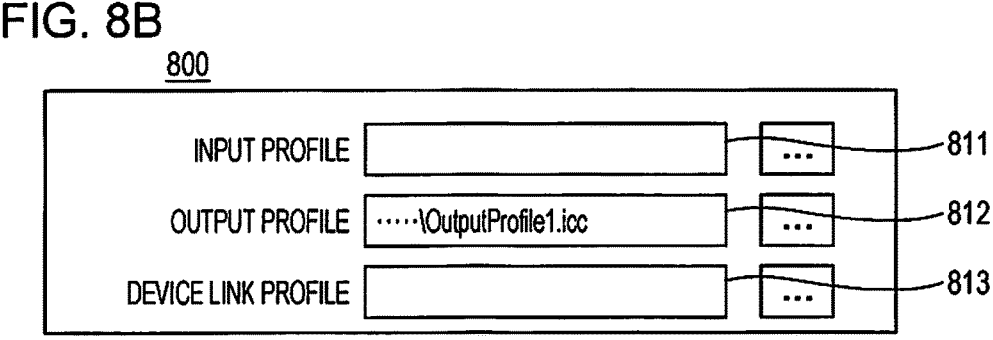
Figure 8C:
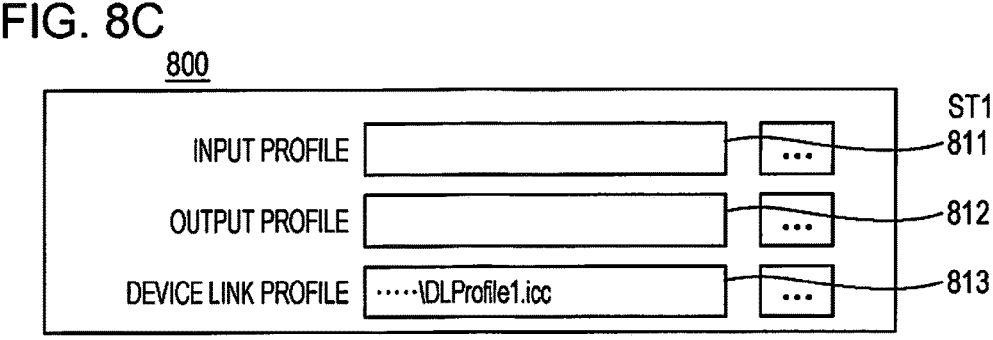

As illustrated in FIG. 8A, when the input profile 610 is selected only in the input profile selection field 811, as illustrated in FIG. 19A, only the input profile 610 is used for the color conversion and the input profile 610 automatically becomes the adjustment target profile 550. In this case, the CMYK values are applied as the first coordinate values and the Lab values are applied as the second coordinate values. As illustrated in FIG. 8B, when the output profile 620 is selected only in the output profile selection field 812, as illustrated in FIG. 19B, only the output profile 620 is used for the color conversion and the output profile 620 automatically becomes the adjustment target profile 550. In this case, the Lab values are applied as the first coordinate values and the cmyk values are applied as the second coordinate values. As illustrated in FIG. 8C, when the device link profile 630 is selected only in the device link profile selection field 813, as illustrated in FIG. 19C, the device link profile 630 is used for the color conversion and the device link profile 630 (specifically, an internal device link table) automatically becomes the adjustment target profile 550. In this case, the CMYK values are applied as the first coordinate values and the cmyk values are applied as the second coordinate values.

Figure 8D:
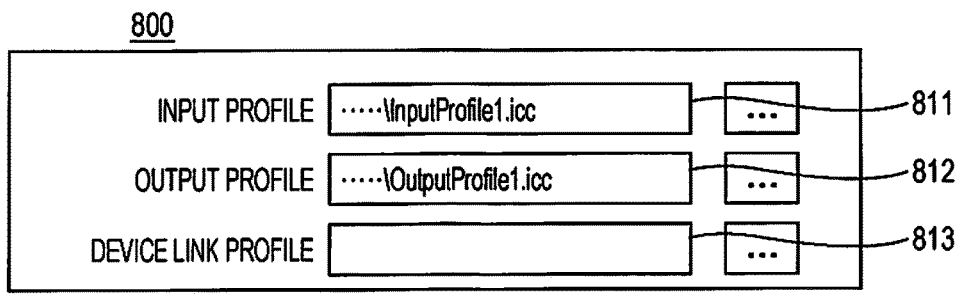

As illustrated in FIG. 8D, when the input profile 610 is selected only in the input profile selection field 811 and the output profile 620 is further selected in the output profile selection field 812, as illustrated in FIGS. 19D and 19E, the input profile 610 and the output profile 620 are combined to be used for the color conversion. In this case, the CMYK values are applied as the first coordinate values and the cmyk values are applied as the second coordinate values.

As described above, one of the combination of the profiles to be used for the color conversion and one profile which is the adjustment target profile 550 to be used for the color conversion is selected in the selection fields 811 to 813.

Next, the process of S212 will be described with reference to FIGS. 7 and 9A to 9D.

The host device 100 executes a process of changing a designated item of the adjustment target profile designation field 820 in response to the selection in the above-described selection fields 811 to 813.

Figure 9A:
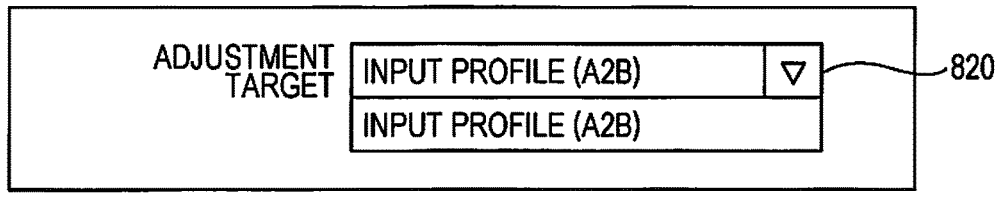
FIGS. 9A to 9D are diagrams schematically illustrating examples in which an adjustment target profile is accepted.

As illustrated in FIG. 8A, when the input profile 610 is selected only in the input profile selection field 811, as illustrated in FIG. 9A, only the input profile 610 can be designated as an adjustment target in the adjustment target profile designation field 820.

Figure 9B:
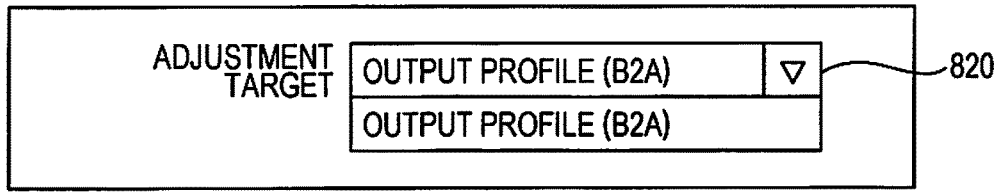

As illustrated in FIG. 8B, when the output profile 620 is selected only in the output profile selection field 812, as illustrated in FIG. 9B, only the output profile 620 can be designated as an adjustment target in the adjustment target profile designation field 820.

Figure 9C:
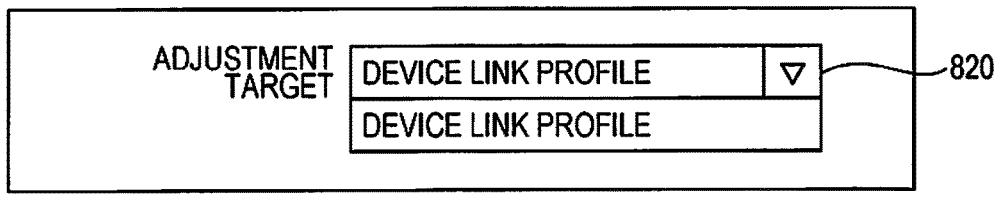

As illustrated in FIG. 8C, when the device link profile 630 is selected only in the device link profile selection field 813, as illustrated in FIG. 9C, only the device link profile 630 can be designated as an adjustment target in the adjustment target profile designation field 820.

Figure 9D:
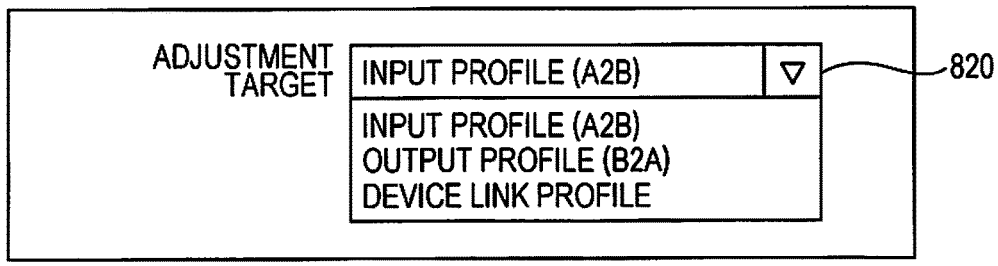

As illustrated in FIG. 8D, when the input profile 610 is selected in the input profile selection field 811 and the output profile 620 is further selected in the output profile selection field 812, as illustrated in FIG. 9D, one designation item can be selected from a plurality of designation items in the adjustment target profile designation field 820. The plurality of designation items include the input profile 610, the output profile 620, and the device link profile 630. As illustrated in FIG. 9D, the selected input profile 610 is selected. This case is equivalent to "(b-1) Designate input profile in combination of input and output profiles" illustrated in FIG. 19D. When the output profile 620 is selected in the adjustment target profile designation field 820, this case is equivalent to "(b-2) Designate output profile in combination of input and output profiles" illustrated in FIG. 19E. When the device link profile 630 is selected in the adjustment target designation field 820, this case is assumed to be applied to "(a-3) Select only device link profile" illustrated in FIG. 19C.

As described above, when the combination of the input profile 610 and the output profile 620 is selected, one of the profiles 610, 620, and 630 is designated as the adjustment target profile 550 in the adjustment target profile designation field 820.

In the adjustment target profile designation field 820, validation or invalidation of an operation on the above-described selection fields 811 to 813 may be controlled in response to the selection so that the input profile 610, the output profile 620, and the device link profile 630 can all be selected as the adjustment target.

Further, the process of S213 will be described with reference to FIGS. 7, 10A to 10C, and the like.

The host device 100 executes a process of changing a selection item of the adjustment target color space selection field 830 in response to selection on the above-described selection fields 811 to 813.

Figure 10A:
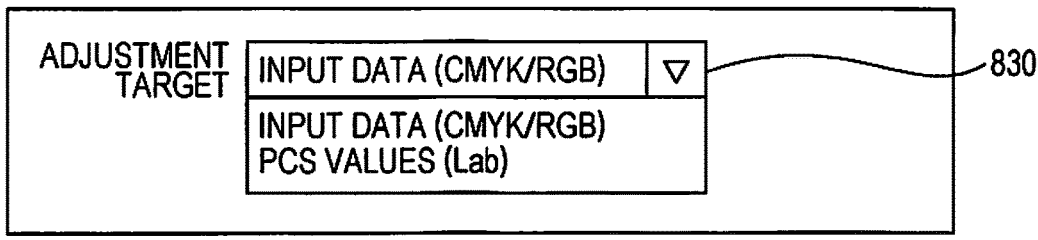
FIGS. 10A to 10C are diagrams schematically illustrating examples in which an adjustment target color space is accepted.

As illustrated in FIG. 8A, when the input profile 610 is selected only in the input profile selection field 811, as illustrated in FIG. 10A, one selection item can be designated among the plurality of selection items in the adjustment target color space selection field 830. In this case, the plurality of selection items include "input data" and "PCS values". The "input data" is an item in which the CMYK color space (which is an example of the first color space CS1 and the input color space CS4) is selected as the adjustment target color space CS6 (see FIG. 21A). The "PCS values" is an item in which the Lab color space (which is an example of the profile connection space CS3 and the output color space CS5) is selected as the adjustment target color space CS6 (see FIG. 21B).

Figure 10B:
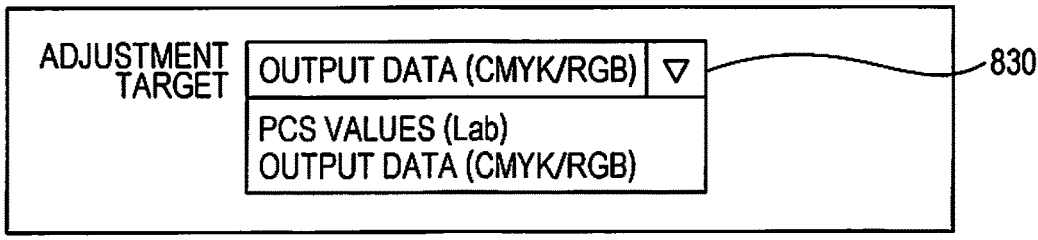

As illustrated in FIG. 8B, when the output profile 620 is selected only in the output profile selection field 812, as illustrated in FIG. 10B, one selection item can be designated among the plurality of selection items in the adjustment target color space selection field 830. In this case, the plurality of selection items include "PCS values" and "output data". The "PCS values" is an item in which the Lab color space (which is an example of the profile space CS3 and the input color space CS4) is selected as the adjustment target color space CS6 (see FIG. 21C). The "output data" is an item in which the cmyk color space (which is an example of the second color space CS2 and the output color space CS5) is selected as the adjustment target color space CS6 (see FIG. 21D).

Figure 10C:
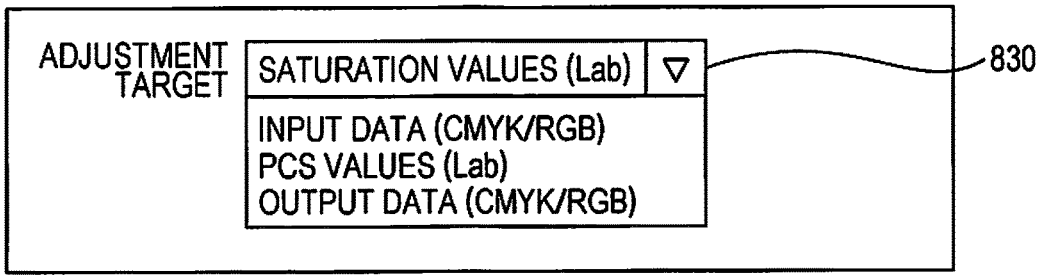

As illustrated in FIG. 8D, when the input profile 610 is selected in the input profile selection field 811 and the output profile 620 is further selected in the output profile selection field 812, as illustrated in FIG. 10C, one selection item can be designated among the plurality of selection items in the adjustment target color space selection field 830. In this case, the plurality of selection items include: "input data", "output data", and "PCS values". The "input data" is an item in which the CMYK color space (which is an example of the first color space CS1 and the input color space CS4 in the input profile 610) is selected as the adjustment target color space CS6 (see FIG. 22A). The "output data" is an item in which the cmyk color space (which is an example of the second color space CS2 and the output color space CS5 in the output profile 620) is selected as the adjustment target color space CS6 (see FIG. 22B). The "PCS values" is an item in which the Lab color space (which is the profile connection space CS3, an example of the output color space CS5 in the input profile 610, and the input color space CS4 in the output profile 620) is selected as the adjustment target color space CS6 (see FIG. 22C).

As illustrated in FIG. 8C, when the device link profile 630 is selected only in the device link profile selection field 813, as illustrated in FIG. 10C, one can be designated from "input data", "output data", and "PCS values" in the adjustment target color space selection field 830.

As described above, one color space of two or more kinds of color spaces among the CMYK color space (CS1), the cmyk color space (CS2), and the Lab color space (CS3) is selected as the adjustment target color space CS6.

Further, the process of S214 will be described with reference to FIGS. 4, 7, 10 to 12, and the like.

When an operation on the history load button 881 illustrated in FIG. 7 is accepted, the host device 100 executes a history information reading process illustrated in FIG. 11. Here, S302 to S314 and S320 correspond to the reading step ST1, the reading function FU1, and the reading unit U1. S316 to S318 correspond to the specific point designation process ST2, the specific point designation function FU2, and the specific point designation unit U2.

When the history information reading process illustrated in FIG. 11 starts, the host device 100 asks a question such as "Is adjustment point load from another profile?", displays a selection button on the display device 115, and causes the process to branch according to the operated button (S302). When a button such as a "YES" button indicating that the adjustment point is loaded from another second profile 502 is operated, the host device 100 executes a history information utilizing process illustrated in FIG. 12 (S320) and ends the history information reading process. When the history information utilizing process is executed, a profile reading the history information 700 in S402 is the first profile 501. The table of the first profile 501 becomes the first table 511, the adjustment target profile 550 becomes the second profile 502, and the table of the second profile 502 becomes the second table 512. The details of the history information utilizing process will be described below.

When a button such as a "No" button indicating that the adjustment point is not loaded from another profile is operated, the host device 100 executes a process subsequent to S304. In this case, the adjustment target profile 550 becomes the first profile 501 and the table of the first profile 501 becomes the first table 511.

The host device 100 first executes a process of reading the history information 700 indicating the adjustment content at the adjustment point P0 in the adjustment target profile 550 from the private tag 523 (S304). Here, when the history information 700 is not stored in the private tag 523 (NO in S306), the host device 100 ends the history information reading process. When the history information 700 is stored in the private tag 523 (YES in S306), the host device 100 displays a UI screen showing the read history information 700 and accepts a countermeasure from the user (S308).

FIG. 13A schematically exemplifies the structure of the history information 700 stored in the private tag 523 of the adjustment target profile 550. In the history information 700 illustrated in FIG. 13A, the adjustment content including No (identification number), an adjustment date, an adjustment time, the number of adjustment points P0, and the original table can be allocated whenever adjustment target profile 550 is adjusted. The adjustment content includes the following items (A) to (H):

(A) coordinates of the adjustment point P0 corresponding to the adjustment target color;
(B) adjustment amounts (adjustment target T0) at the adjustment point P0;
(C) information indicating which table the adjustment target table is among the input profile 610, the output profile 620, and the device link profile 630;
(D) an adjustment range A0 in which the adjustment point P0 is set as the base point;

(E) coordinates of a pair of adjustment points P1 and P2;
(F) a file name of the third profile combined with the adjustment target profile 550;
(G) a time stamp (update date) of the third profile; and
(H) an original table before adjusting the first table 511.

In the history information 700, some of the items (A) to (H) may be omitted.

The third profile becomes the output profile 620 when the input profile 610 and the output profile 620 are combined and the input profile 610 is the adjustment target profile 550. The third profile becomes the input profile 610 when the input profile 610 and the output profile 620 are combined and the output profile 620 is the adjustment target profile 550.

In FIG. 13A, for example, adjustment of No. 1 indicates that 106 adjustment points P0 are adjusted at an adjustment time 10:50 on an adjustment day 2017 Mar. 20. Adjustment content of No. 1 also includes an original table 1 before adjustment with regard to the 106 adjustment points P0. Adjustment content of No. 2 includes no original table before adjustment with regard to 5 adjustment points P0.

The host device 100 displays a user interface (UI) screen 801 illustrated in FIG. 13B based on the history information 700 illustrated in FIG. 13A. The UI screen 801 includes No (identification number) for identifying executed adjustment, an adjustment day, an adjustment date, the number of adjustment points P0, and a designation field 901 corresponding to each adjustment. In the designation field 901, for example, an operation of designating "Confirm adjustment result", "Apply adjustment point to another profile", and "Cancel adjustment result" can be executed. "Confirm adjustment result" is an instruction to display an adjustment result on the UI screen 802 illustrated in FIG. 14A. "Apply adjustment point to another profile" is an instruction to apply the adjustment points P0 to the table of a profile different from the current adjustment target profile 550. "Cancel adjustment result" is a cancellation instruction to return the table of the adjustment target profile 550 to the original table in an adjustment unit. The host device 100 accepts an operation on the designation field 901 and executes a process subsequent to S310 according to the designation content to the designation field 901.

In S310, the host device 100 causes the process to branch depending on whether there is the original table before the adjustment in the history information 700 of the private tag 523. When there is no original table, the previous adjustment result may not be cancelled. Therefore, the host device 100 causes the process to proceed to S316. When there is the original table, the host device 100 causes the process to branch depending on whether "Cancel adjustment result" is designated in the designation field 901 (S312). When "Cancel adjustment result" is not designated, the host device 100 causes the process to proceed to S316. When "Cancel adjustment result" is designated, the host device 100 executes a process of cancelling the adjustment result of the corresponding identification number (S314). This process can be a process of returning the first table 511 of the adjustment target profile 550 to the original table in the adjustment of the corresponding identification number. At this time, in the adjustment of the corresponding identification number, information indicating the adjustment content of the return from the original table to the first table 511 may be deleted from the history information 700. FIG. 13C schematically illustrates the structure of the history information 700 when the adjustment result of No. 3 is cancelled and the information indicating the adjustment content of the return from the original table to the first table 511 is deleted from the history information 700.

In S316, the host device 100 causes the process to branch depending on whether there are the adjustment points P0 at which "Confirm adjustment result" is designated in the designation field 901 and a sentence "Treat as fixed points" is designated in the designation field 903 of the UI screen 802 illustrated in FIG. 14A. The "fixed points" mean that adjustment amounts are 0, that is, the adjustment points are set as specific points SP at which readjustment is not executed. The UI screen 802 illustrated in FIG. 14A is displayed when "Confirm adjustment result" is designated in the designation field 901 illustrated in FIG. 13B. The UI screen 802 includes a designation field 902 indicating whether all the adjustment points P0 at which "Confirm adjustment result" is designated is treated as the specific points SP in principle and includes No (identification number) for identifying the set adjustment point P0, coordinates of the adjustment point P0, an adjustment day, and designation fields 903 of a countermeasure for each adjustment point P0. When "Treat as fixed point" is designated in the designation field 902, all the designation fields 903 are set to "Treat as fixed point" at first. When "Treat as fixed point" is not designated in the designation field 902, all the designation fields 903 are set to "Not treat as fixed point" at first. Further, in each designation field 903, "Treat as fixed point" and "Not treat as fixed point" is switched. When there is no designation field 903 in which "Treat as fixed point" is designated, there is no adjustment point P0 which is the specific point SP. Therefore, the host device 100 ends the history information reading process.

When there is the designation field 903 in which "Treat as fixed point" is designated, as illustrated in FIG. 14B, the host device 100 adds the adjustment point P0 in which "Treat as fixed point" is designated, as the specific point SP with the adjustment amounts of 0 to the target acceptance region 840 (S318) and ends the history information reading process. In the example illustrated in FIG. 14B, the adjustment point P0 of ID=1 and 2 is the specific point SP and $\Delta c=\Delta m=\Delta y=\Delta k=0$ indicating that the adjustment amounts are not readjusted are set.

When the adjustment point P0 is loaded from another profile (the first profile 501) in S320, the process of accepting the specific point SP in S318 is not executed. Accordingly, when the second table 512 of the second profile 502 different from the first profile 501 from which the adjustment point P0 is loaded is adjusted, the specific point SP is not accepted.

When the adjustment point P0 is loaded from the other first profile 501 (S320), the host device 100 first accepts designation of the first profile 501 from which the history information is read in the history information utilizing process of FIG. 12 (S402). For example, the host device 100 displays a first profile selection field 891 on the display device 115 and accepts an operation of designating the first profile 501 in the first profile selection field 891. The first profile 501 is not limited to the same type of profile as the second profile 502 which is the adjustment target profile 550 (whether the profile is the input profile 610, the output profile 620, or the device link profile 630), but may be another type of profile as long as a subsequent process of S404 can be executed.

After the first profile 501 is designated, the host device 100 executes a process of reading the history information 700 from the private tag 523 of the first profile 501 (S404) and ends the history information utilizing process. The read history information 700 includes the coordinates of the adjustment point P0, adjustment amounts (the adjustment target T0) at the adjustment point P0, the adjustment range A0 in which the adjustment point P0 is set as the base point, and the coordinates of the pair of adjustment points P1 and P2. Here, the adjustment amounts are used as initial values and are changeable.

For example, when important colors are used for corporate colors or the like, the profile used in an operation is changed in some cases. When the adjustment point P0 or the adjustment range A0 may not be utilized from a different profile, the adjustment point P0 or the adjustment range A0 have to be input whenever the profile is changed. Thus, the work for adjusting the profile is troublesome to that extent. When a color chart for color measurement is determined for a calibration profile and the profile is different, the adjustment point P0 or the adjustment range A0 have to be adjusted again. Thus, the work for adjusting the profile is troublesome to that extent. In the specific example, since the history information 700 can be utilized from a different profile, inputting the adjustment point P0 or the adjustment range A0 is omitted even when the profile is changed. Thus, the work for adjusting the profile is reduced.

Further, the process of S215 will be described with reference to FIGS. 7, 16A, 16B, 17 and the like.

The host device 100 executes a process of changing an input item of the target acceptance region 840 in response to selection in the above-described fields 811 to 813 and 830. The host device 100 executes a process of changing an input item of the target acceptance region 840 in response to selection in the adjustment data selection field 845.

Figure 16A:
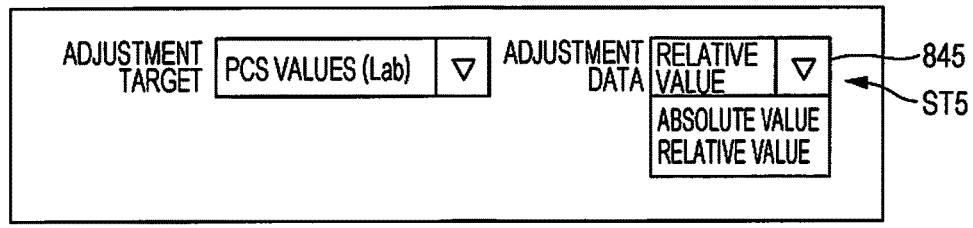
FIG. 16A is a diagram schematically illustrating an example in which an adjustment target inputting method is accepted.

As illustrated in FIG. 16A, one of "absolute value" and "relative value" can be selected in the adjustment data selection field 845. The "absolute value" is an option for accepting the adjustment target T0 as the coordinate values of a color space. The "relative value" is an option for accepting the adjustment target T0 as a difference from the current coordinate values of the color space.

Figure 16B:
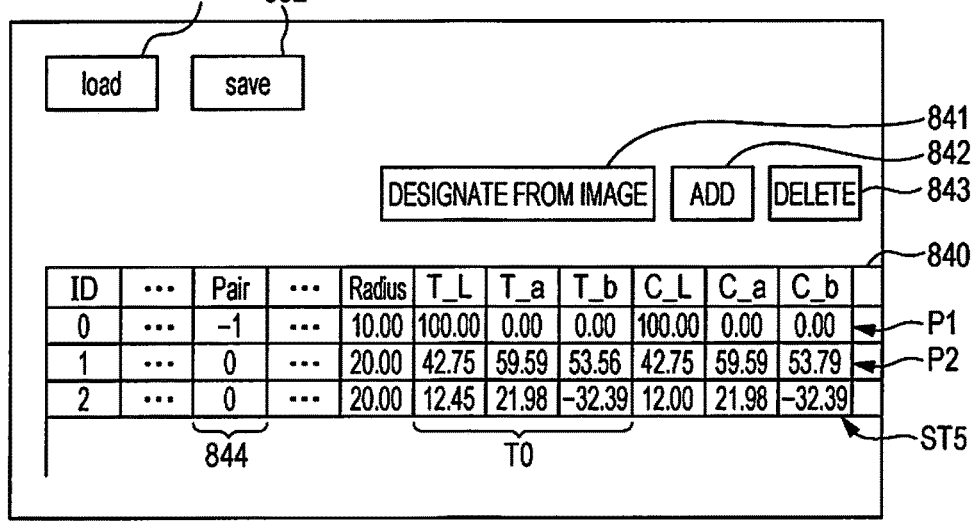
FIG. 16B is a diagram schematically illustrating an example of a UI screen when an adjustment target is accepted as coordinate values of a color space.

When the "absolute value" is selected in the adjustment data selection field 845, as illustrated in FIG. 16B, an input field of coordinate values (T_L, T_a, T_b) of the adjustment target T0 is displayed along with a display field of the current coordinate values (C_L, C_a, C_b) of the color space in the target acceptance region 840. FIG. 16B illustrates an example of a case in which the Lab color space is selected as the adjustment target color space CS6.

When the "relative value" is selected in the adjustment data selection field 845, as illustrated in FIG. 7, an input field of coordinate values (ΔL, Δa, Δb) of the adjustment target T0 which are differences from the current coordinate values of the color space is displayed in the target acceptance region 840. FIG. 7 illustrates an example of a case in which the Lab color space is selected as the adjustment target color space CS6.

When the history information 700 is read from the adjustment target profile 550 which is the first profile 501, the adjustment point P0 included in the read history information 700 and the adjustment content of the adjustment point P0 is displayed in the target acceptance region 840. When the history information 700 is read from the second profile 502 different from the adjustment target profile 550, the adjustment point P0 included in the read history information 700, the adjustment amounts (the adjustment target T0) of the adjustment point P0, the adjustment range A0, and the pair of adjustment points P1 and P2 are displayed in the target acceptance region 840. The host device 100 accepts correction of the adjustment content at the adjustment point P0 included in the read history information 700. The host device 100 accepts addition of the adjustment point P0 corresponding to a new adjustment target color and setting of the adjustment content at the added adjustment point P0.

Figure 16C:
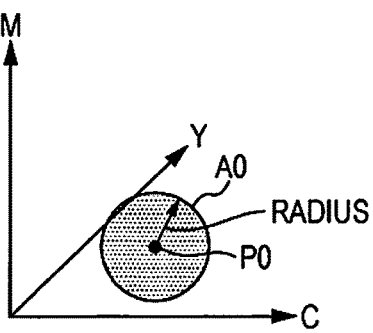
FIG. 16C is a diagram schematically illustrating an example in which an adjustment point is set.

As illustrated in FIG. 16C, the adjustment point P0 for setting the adjustment target T0 is set in the CMYK color space (CS1). Here, since the CMYK color space is a 4-dimensional color space, a 3-dimensional virtual space formed by C, M, and Y axes is illustrated in FIG. 16C.

For example, when an operation on the button 841 of "designate from image" on the UI screen 800 illustrated in FIGS. 7 and 16B is accepted, the host device 100 displays a screen for schematically showing the CMYK color space (CS1) on the display device 115, acquires the CMYK values in response to an operation by the input device 116, and updates information regarding the target acceptance region 840. When the new adjustment point P0 is designated, the host device 100 grants a corresponding ID (identification information) and displays the acquired CMYK values and the coordinate values of the output color space CS5 requested from the CMYK values in correspondence to the ID in the target acceptance region 840. When the addition button 842 is operated, the host device 100 adds the ID to increase an input field corresponding to the added ID in the target acceptance region 840. When the deletion button 843 is operated, the host device 100 accepts designation of the ID to be deleted and deletes the input field corresponding to the ID designated.

When an operation on the history load button 881 is accepted, the host device 100 reads the history information 700 of the adjustment stored in the storage device 114 and adds the history information 700 in the target acceptance region 840. When an operation on the history save button 882 is accepted, the host device 100 stores information regarding the target acceptance region 840 as the history information 700 in the storage device 114.

The adjustment target T0 accepted in the target acceptance region 840 is changed as follows depending on selected content of the adjustment target color space selection field 830 and selected content of the adjustment data selection field 845.

(Selected Content 1) The CMYK color space is selected as the adjustment target color space CS6 and the "absolute value" is selected as an input of the adjustment target T0. In this case, the input of the adjustment target T0 is the CMYK values (which are assumed to be T_C, T_M, T_Y, T_K). The CMYK values are expressed in, for example, 0 to 100%.

(Selected Content 2) The CMYK color space is selected as the adjustment target color space CS6 and the "relative value" is selected as an input of the adjustment target T0. In this case, the input of the adjustment target T0 is differences (which are assumed to be ΔC, ΔM, ΔY, ΔK) of the target values (T_C, T_M, T_Y, T_K) of the current values (C_C, C_M, C_Y, C_K) of the CMYK values.

(Selected Content 3) The Lab color space is selected as the adjustment target color space CS6 and the "absolute value" is selected as an input of the adjustment target T0. In this case, the input of the adjustment target T0 is the Lab values (which are assumed to be T_L, T_a, T_b).

(Selected Content 4) The Lab color space is selected as the adjustment target color space CS6 and the "relative value" is selected as an input of the adjustment target T0. In this case, the input of the adjustment target T0 is differences (which are assumed to be ΔL, Δa, and Δb) of the target values (T_L, T_a, T_b) of the current values (C_L, C_a, C_b) of the Lab values.

(Selected Content 5) The cmyk color space is selected as the adjustment target color space CS6 and the "absolute value" is selected as an input of the adjustment target T0. In this case, the input of the adjustment target T0 is the cmyk values (which are assumed to be T_c, T_m, T_y, T_k). The cmyk values are expressed in, for example, 0 to 100%.

(Selected Content 6) The cmyk color space is selected as the adjustment target color space CS6 and the "relative value" is selected as an input of the adjustment target T0. In this case, the input of the adjustment target T0 is differences (which are assumed to be Δc, Δm, Δy, Δk) of the target values (T_c, T_m, T_y, T_k) of the current values (C_c, C_m, C_y, C_k) of the cmyk values.

As described above, the adjustment target T0 is accepted at the coordinates indicating the adjustment point P0 in the adjustment target color space CS6.

The target acceptance region 840 illustrated in FIGS. 7 and 16B includes a pair designation region 844 for executing adjustment in association with the plurality of adjustment points P0. Designation of a pair of adjustment points P0 is used, for example, when all the colors of gradation between a certain color (for example, white: the first adjustment point P1 illustrated in FIG. 28) and another color (for example, red or blue: the second adjustment point P2 illustrated in FIG. 28) are desired to be adjusted, as in a gradation image IM1 illustrated in FIG. 28. In the pair designation region 844, an ID of another adjustment point associated with a certain adjustment point is stored. For example, an adjustment point of ID=1 is associated with an adjustment point of ID=0 and an adjustment point of ID=2 is also associated with the adjustment point of ID=0. "−1" of the pair designation region 844 indicates that an adjustment point is not associated with another adjustment point. For example, when an operation on the pair designation region 844 illustrated in FIGS. 7 and 16B is accepted, the host device 100 displays a pair designation screen 910 illustrated in FIG. 17 on the display device 115.

Figure 17:
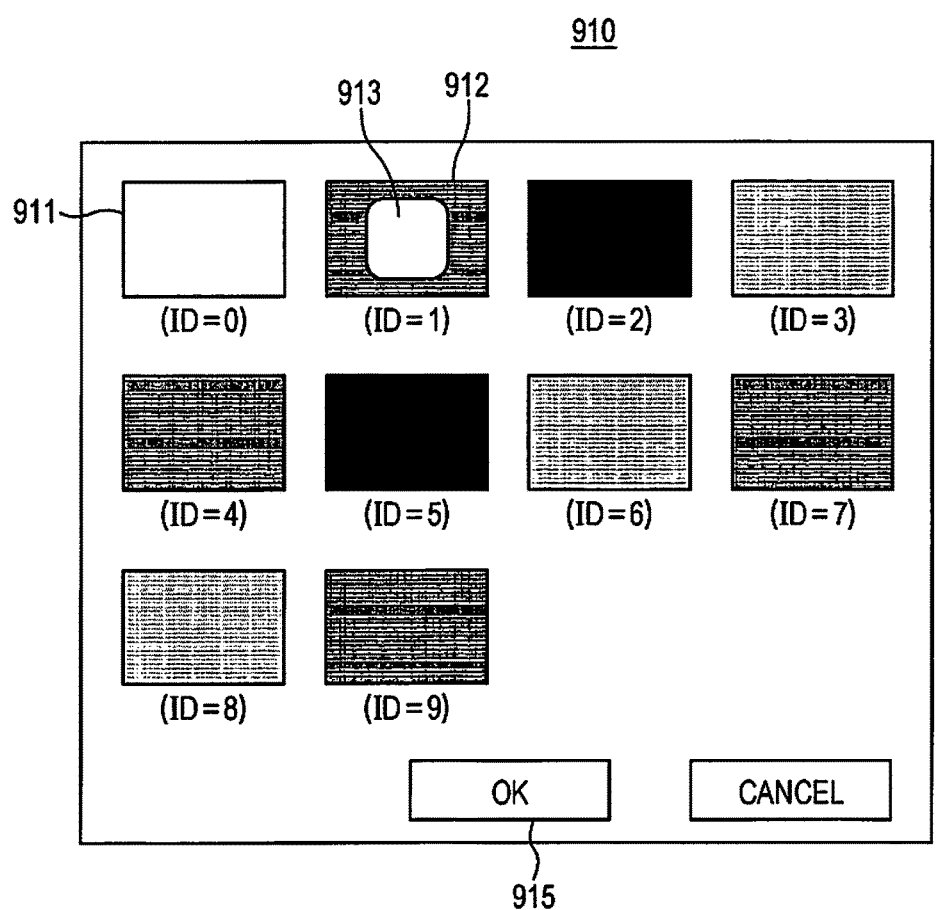
FIG. 17 is a diagram schematically illustrating an example of a pair designation screen.

FIG. 17 illustrates the pair designation screen 910 for associating the plurality of adjustment points P0 with each other when the adjustment points P0 of ID=0 to 9 are set. For example, the host device 100 displays a color 913 of a first display region 911 within a second display region 912 when an operation on the first display region 911 at an adjustment point set as the first adjustment point P1 is accepted by the input device 116 and an operation on the second display region 912 at an adjustment point set as the second adjustment point P2 is accepted by the input device 116. When an operation on an OK button 915 is accepted by the input device 116, the host device 100 accepts setting of the first adjustment point P1 at the first coordinates and the second adjustment point P2 at the second coordinates. Here, when the positions of the adjustment points P1 and P2 are indicated with coordinate values of the CMYK color space, the CMYK values at the first coordinates are (0.00, 0.00, 0.00, 0.00) and the CMYK values at the second coordinates are (5.10, 100.00, 100.00, 1.18) in the example illustrated in FIG. 7. In this case, ID "0" of the first adjustment point P1 corresponding to the first display region 911 is displayed in a display region of the second adjustment point P2 corresponding to the second display region 912 in the pair designation region 844 illustrated in FIGS. 7 and 16B.

Here, the target T0 at the first adjustment point P1 illustrated in FIGS. 7 and 16B is a first target T1 (see FIG. 18B) of adjustment at the first adjustment point P1 and is an example of first adjustment data indicating the degree of adjustment at the first adjustment point P1. The target T0 at the second adjustment point P2 illustrated in FIGS. 7 and 16B is a second target T2 (see FIG. 18B) of adjustment at the second adjustment point P2 and is an example of second adjustment data indicating the degree of adjustment at the second adjustment point P2.

As described above, the first target T1 and the second target T2 are set.

Further, the process of S216 will be described with reference to FIG. 7 and the like.

The host device 100 accepts designation of whether the adjustment range A0 adjusted based on the adjustment target T0 is the whole color space in the adjustment range designation field 850. A plurality of designation items of the adjustment range designation field 850 illustrated in FIG. 7 include "whole input space" and "radius", although not illustrated. When the "whole input space" is designated, the adjustment range A0 is set to the whole color space. When the "radius" is designated, the host device 100 accepts an input of a radius set using the adjustment point P0 as a base point in the input field of "Radius" of the target acceptance region 840, as illustrated in FIG. 16B. This radius is expressed in, for example, 0 to 100% of the relative value of a Euclid distance in the first color space CS1. FIG. 16C schematically illustrates an example of the adjustment range A0 when the radius (Radius) is designated.

Here, the radius at the first adjustment point P1 illustrated in FIG. 16B is the first adjustment range A1 (see FIG. 18A) in which the first adjustment point P1 is set to the base point and is an example of the first adjustment data indicating the degree of adjustment at the first adjustment point P1. The radius at the second adjustment point P2 illustrated in FIGS. 7 and 16B is the second adjustment range A2 (see FIG. 18A) in which the second adjustment point P2 is set as the base point and is an example of the second adjustment data indicating the degree of adjustment at the second adjustment point P2.

As described above, the first adjustment range A1 and the second adjustment range A2 are set in the adjustment target profile 550 in the first color space CS1.

Further, the process of S217 will be described with reference to FIG. 7 and the like.

The host device 100 accepts designation of a rendering intent for defining a correspondent relation of the adjustment target profile 550 in the intent designation field 860. A plurality of designation items of the intent designation field 860 illustrated in FIG. 7 are three kinds of items, "Perceptual", and "Relative Colorimetric". Of course, the designation items may include "Absolute Colorimetric", and some of "Perceptual", "Relative Colorimetric", and "Saturation" may not be included in the designation items. FIG. 7 illustrates an example in which "Perceptual" is designated as the designation intent.

As described above, one of the plurality of rendering intents for defining the correspondent relation of the adjustment target profile 550 is accepted as a designation intent.

Further, the process of S218 will be described with reference to FIGS. 4, 7, 15, and the like.

When an operation on the history save button 882 illustrated in FIG. 7 is accepted, the host device 100 executes a history information storing process illustrated in FIG. 15. Here, S502 and S508 correspond to the storage step ST7, the storage function FU7, and the storage unit U7. S504 to S508 correspond to the linkage step ST8, the linkage function FU8, and the linkage unit U8.

When the history information storing process illustrated in FIG. 15 starts, the host device 100 displays the UI screen 803 on which designation of an item to be stored among the items (A) to (H) of the above-described adjustment content is accepted, on the display device 115 and accepts the designation of the item to be stored as the history information 700 in the private tag 523 of the adjustment target profile 550 (S502). There is a check box for each of the items (A) to (H) and an item checked in the check box is stored in the private tag 523. In the example of FIG. 15, (A) the coordinates of the adjustment point P0, (B) the adjustment amounts (the adjustment target T0) at the adjustment point P0, (C) a form of the adjustment target profile 550, (D) the adjustment range A0, and (E) the coordinates of the pair of adjustment points P1 and P2 are illustrated. In addition, (A) the coordinates of the adjustment point P0 and (B) the adjustment amounts at the adjustment point P0 are necessarily designated (the designation thereof may not be excluded).

After the designation of the item is accepted, the host device 100 causes the process to branch depending on whether the time stamp of the third profile combined with (G) the adjustment target profile 550 is designated (S504). When the time stamp of the third profile is not designated, the host device 100 causes the process to proceed to S508. When the time stamp of the third profile is designated, the host device 100 reads the time stamp of the combined third profile (S506). For example, when the input profile 610 is the adjustment target profile 550, the time stamp of the combined output profile 620 may be read. When the output profile 620 is the adjustment target profile 550, the time stamp of the combined input profile 610 may be read.

In S508, the host device 100 stores the item of which the designation is accepted on the UI screen 803 in the private tag 523 of the adjustment target profile 550 and ends the history information storing process. Then, as illustrated in FIG. 13A, the history information 700 is accumulated in the private tag 523 of the adjustment target profile 550. When the time stamp of the third profile is designated, the time stamp of the third profile is linked to the adjustment target profile 550 (the first profile 501).

When the operation on the adjustment execution button 870 illustrated in FIG. 7 is accepted, the host device 100 ends the process of S210 in FIG. 6 and executes a process of adding the third adjustment point Qx between the pair of adjustment points P1 and P2 (S220). Here, the variable x is a variable for identifying the third adjustment point Q. In the process of S220, the third adjustment point Qx at the third coordinates is set between the first coordinates of the first adjustment point P1 and the second coordinates of the second adjustment point P2. Here, the coordinates indicating the positions of the adjustment points P1, P2, and Qx are assumed to be coordinate values of the input color space CS4 of the adjustment target profile 550. For example, when the input profile 610 is the adjustment target profile 550, the coordinates of the adjustment points P1, P2, and Qx are expressed by the CMYK values. When the output profile 620 is the adjustment target profile 550, the coordinates of the adjustment points P1, P2, and Qx are expressed by the Lab values. When the device link profile 630 is the adjustment target profile 550, the coordinates of the adjustment points P1, P2, and Qx are expressed by the CMYK values.

Figure 18A:
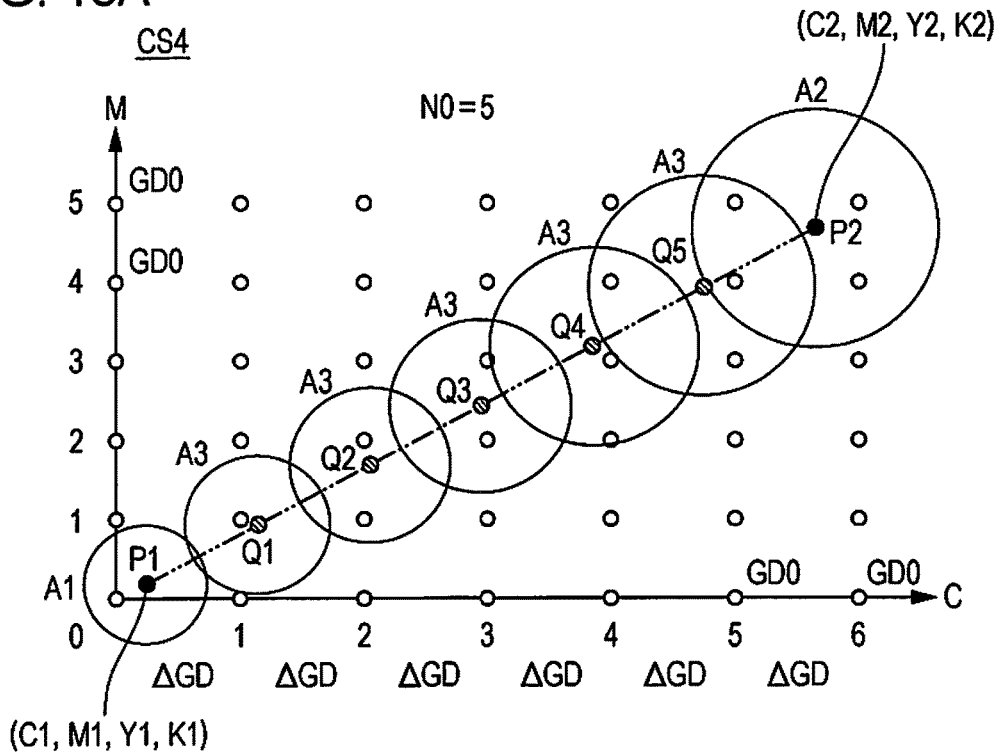
FIG. 18A is a diagram schematically illustrating an example in which a third adjustment point is added between first and second adjustment points and an adjustment range is determined setting the third adjustment point as a base point.

FIG. 18A schematically exemplifies a form in which the third adjustment point Qx is added between the first adjustment point P1 and the second adjustment point P2 and the third adjustment range A3 in which the third adjustment point Qx is set as the base point is determined when the input color space CS4 is the CMYK color space. In the CMYK color space, C, M, Y, and K axes are set as coordinate axes. In FIG. 18A, to facilitate the understanding, the input color space CS4 of the adjustment target profile 550 is illustrated on a plane passing the C and M axes. Here, a white circle indicates a lattice point GD0 of the adjustment target profile 550, black circles indicate the adjustment points P1 and P2, and a hatched circle indicates the third adjustment point Qx. On the C and Y axes of FIG. 18A, coordinate values at which an interval ΔGD between the lattice points GD0 is one unit are shown.

The added third adjustment point Qx is assumed to be generated on a line connecting the adjustment points P1 and P2 in the input color space CS4 of the adjustment target profile 550. The number of added third adjustment points Qx is a number NO based on the interval ΔGD between the lattice points GD0 of the input color space CS4. Here, the number NO is set as small as possible in a range in which a minimum of one third adjustment point Qx is entered between the lattice points of the adjustment target profile 550.

For example, it is assumed that the input color space CS4 is the CMYK color space, the coordinates of the first adjustment point P1 at which the interval ΔGD between the lattice points GD0 is the unit are (C1, M1, Y1, K1), and the coordinates of the second adjustment point P2 at which the interval ΔGD between the lattice points GD0 is the unit are (C2, M2, Y2, and K2). In this case, the position of the third adjustment point Qx can be set as follows, for example.

First, of the C, M, Y, and K axes of the CMYK color space, coordinate axes are selected on which a distance between the first adjustment point P1 and the second adjustment point P2 at which the interval ΔGD between the lattice points GD0 is the unit is the longest. The coordinate axis which has the largest value among |C2−C1|, |M2−M1|, |Y2−Y1|, and |K2−K1| may be selected. The example of FIG. 18A indicates that the C axis is selected on the assumption that 5<|C2−C1|<6, 4<|M2−M1|<5, and |C2−C1| is greater than |M2−M1| and greater than |Y2−Y1| and |K2−K1|.

Next, the number NO of third adjustment points Qx at which the interval is equal to or less than the interval ΔGD between the lattice points GD0 is set in the direction of the selected coordinate axis. FIG. 18A illustrates an example in which the number NO of third adjustment points Qx is reduced as much as possible. For example, when the C axis is selected, N1<|C2−C1|≤N1+1 (where N1 is a positive integer), and N0=N1, the interval of the third adjustment point Qx in the C axis direction is equal to or less than the interval ΔGD between the lattice points GD0 and a minimum of one third adjustment point Qx between the lattice points of the adjustment target profile 550 is entered. In the example of FIG. 18A, N0=5 since 5<|C2−C1|<6.

The reason why the number NO of third adjustment points Qx is reduced as much as possible is that a time taken to execute the processes of S104 to S120 in FIG. 5 is reduced as much as possible. On the other hand, even when the processing time is lengthened, the NO of third adjustment points Qx may be increased to improve the gradation property of an output image.

Even when the input color space CS4 is the Lab color space, the third adjustment point Qx can be added in the same way. Here, it is assumed that the coordinates of the first adjustment point P1 at which the interval ΔGD between the lattice points GD0 is the unit are (L1, a1, b1) and the coordinates of the second adjustment point P2 at which the interval ΔGD between the lattice points GD0 is the unit are (L2, a2, b2). First, the coordinate axis which has the largest value among |L2−L1|, |a2−a1|, and |b2−b1| may be selected from the L, a, and b axes of the Lab color space. Subsequently, the NO of third adjustment points Qx at which the interval is equal to or greater than the interval ΔGD between the lattice points GD0 may be set in the direction of the selected coordinate axis.

When the output profile 620 combined with the input profile 610 is adjusted and the coordinates of the adjustment points P1 and P2 are the CMYK values, the coordinates of the adjustment points P1 and P2 may be converted into the Lab values according to the input profile 610 and the third adjustment point Qx may be set in the Lab color space (CS3) based on the coordinates of the adjustment points P1 and P2 in the Lab color space (CS3).

In the (b-2) case illustrated in FIG. 19E, that is, when the combination of the profiles 610 and 620 is selected for color conversion and the output profile 620 is designated as the adjustment target profile 550, the host device 100 converts the coordinates of the adjustment points P1 and P2 designated with the CMYK values into the Lab values and sets the third adjustment point Qx. In this case, referring to the A2B table of the input profile 610, the coordinates (C1, M1, Y1, K1) of the first adjustment point P1 may be converted into (L1, a1, b1) and the coordinates (C2, M2, Y2, K2) of the second adjustment point P2 may be converted into (L2, a2, b2).

Here, as illustrated in FIG. 20, conversion according to a profile (for example, an ICC profile) is assumed to be indicated by $f_{icc}$ (first, second, and third arguments). Here, the first argument indicates a profile to be used. In the first argument, InputProfile indicates an input profile. In the second argument, A2B indicates conversion from device colors to device-independent colors and B2A indicates conversion from device-independent colors to device colors. In the third argument, Input indicates input values (CMYK, RGB, Lab, or the like) of the adjustment point P0. Conversion from CMYK values to Lab values executed with reference to the A2B table of the input profile 610 is indicated by $f_{icc}$ (InputProfile, A2B, Input).

When the coordinates (which are assumed to be L3, a3, b3) of the third adjustment point Qx in the Lab color space are set, the coordinates (L3, a3, b3) of the third adjustment point Qx may be converted into CMYK values (C3, M3, Y3, K3) with reference to the B2A table of the input profile 610. This conversion is indicated by $f_{icc}$ (InputProfile, B2A, Input).

After the third point Q is added, the host device 100 determines the third target T3 of the third adjustment point Qx based on the first target T1 of the first adjustment point P1 and the second target T2 of the second adjustment point P2 (S222). In the process of S222, the third target T3 at the third coordinates of the third adjustment point Qx is interpolated based on the first target T1 at the first coordinates of the first adjustment point P1 and the second target T2 at the second coordinates of the second adjustment point P2.

Figure 18B:
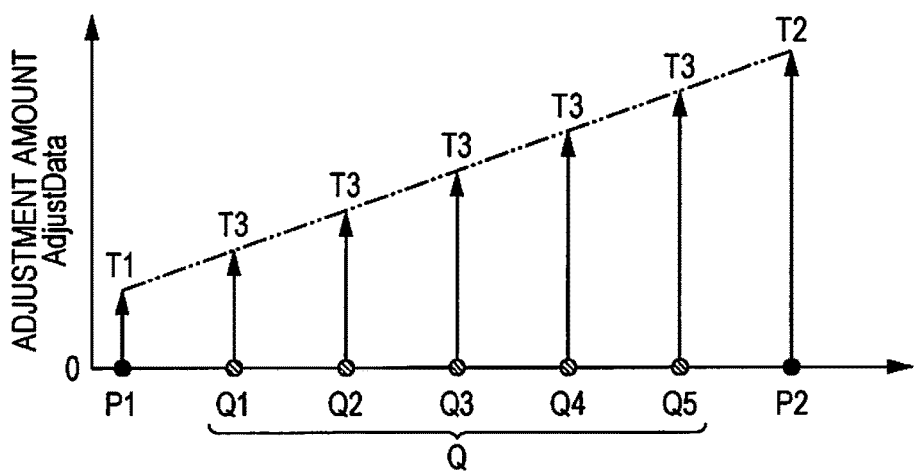
FIG. 18B is a diagram schematically illustrating an example in which an adjustment target at the third adjustment point is determined.

FIG. 18B schematically illustrates a form in which the third target T3 in the adjustment at the third adjustment point Qx is determined by interpolation. In FIG. 18B, the horizontal axis represents the positions of the adjustment points P1, Qx, and P2 and the vertical axis represents adjustment amounts AdjustData. The adjustment amounts AdjustData are expressed as a relative value and is expressed with CMYK values (ΔCp, ΔMp, ΔYp, ΔKp), Lab values (ΔLp, Δap, Δbp), or cmyk values (Δcp, Δmp, Δyp, Δkp).

For example, it is assumed that the adjustment amounts AdjustData are CMYK values and the adjustment amounts AdjustData (which is example of the first target T1) of the first adjustment point P1 are (ΔC1, ΔM1, ΔY1, ΔK1) and the adjustment amounts AdjustData (which are an example of the second target T2) of the second adjustment point P2 is (ΔC2, ΔM2, ΔY2, ΔK2). When the adjustment amounts AdjustData (which is an example of the third target T3) of the third adjustment point Qx are expressed as (ΔC3x, ΔM3x, ΔY3x, ΔK3x), the adjustment amounts AdjustData of the third adjustment point Qx can be calculated by the following interpolation expressions:

$$\Delta C3x = \Delta C1 + x \cdot (\Delta C2 - \Delta C1)/(N0+1);$$

$$\Delta M3x = \Delta M1 + x \cdot (\Delta M2 - \Delta M1)/(N0+1);$$

$$\Delta Y3x = \Delta Y1 + x \cdot (\Delta Y2 - \Delta Y1)/(N0+1); \text{ and}$$

$$\Delta K3x = \Delta K1 + x \cdot (\Delta K2 - \Delta K1)/(N0+1).$$

Even when the adjustment amounts AdjustData are Lab values or cmyk values, the adjustment amounts AdjustData of the third adjustment point Qx can be calculated similarly. The adjustment amounts AdjustData of the third adjustment point Qx are not limited to the interpolated values of the adjustment amounts AdjustData of the adjustment points P1 and P2, but can also be values deviating from the interpolated values.

The host device 100 determines the third adjustment range A3 in which the third adjustment point Qx is set as the base point based on the first adjustment range A1 in which the first adjustment point P1 is set as the base point and the second adjustment range A2 in which the second adjustment point P2 is set as the base point (S224) and ends the profile and the parameter setting process. The process of S224 may be executed before the process of S222. In S224, the third adjustment range A3 for the third coordinates of the third adjustment point Qx is interpolated based on the first adjustment range A1 for the first coordinates of the first adjustment point P1 and the second adjustment range A2 for the second coordinates of the second adjustment point P2.

FIG. 18A also schematically illustrates a form in which the third adjustment range A3 in which the third adjustment point Qx is set as the base point is determined by the interpolation. For example, it is assumed that Radius_1 is the first adjustment range A1 in which the first adjustment point P1 is set as the base point and Radius_2 is the second adjustment range A2 in which the second adjustment point P2 is set as the base point. When Radius_3x indicates the third adjustment range A3 in which the third adjustment point Qx is set as the base point, the third adjustment range A3 can be obtained by the following interpolation expression:

$$\text{Radius\_3}x = \text{Radius\_1} + x \cdot (\text{Radius\_2} - \text{Radius\_1})/(N0+1).$$

The third adjustment range A3 in which the third adjustment point Qx is set as the base point is not limited to the interpolated values of the adjustment ranges A1 and A2 in which the adjustment points P1 and P2 are set as the base points, but can also be values deviating from the interpolated values.

The host device 100 performs a process subsequent to S104 of FIG. 5 when the process of S224 of FIG. 6 ends. When the history information 700 is read from the private tag 523 of the adjustment target profile 550, the table (the first table 511) of the adjustment target profile 550 (the first profile 501) is readjusted. When the history information 700 is read from the private tag 523 of the profile (the first profile 501) different from the adjustment target profile 550, the table (the second table 512) of the adjustment target profile 550 (the second profile 502) is adjusted. When the second table 512 is adjusted, the second table 512 is adjusted in the adjustment range A0 read from the other first profile 501.

When correction of the adjustment content at the adjustment point P0 included in the read history information 700 is accepted, the table of the adjustment target profile 550 is adjusted based on the corrected adjusted content. When the adjustment point P0 is added, the table of the adjustment target profile 550 is adjusted based on the adjustment content at the added adjustment point P0.

Here, when "Perceptual" is designated in the intent designation field 860, the host device 100 uses information appropriate for the A2B0 and B2A0 tags illustrated in FIG. 4 in the profile 500 in the process subsequent to S104. When "Relative Colorimetric" is designated in the intent designation field 860, the host device 100 uses information appropriate for the A2B1 and B2A1 tags illustrated in FIG. 4 in the profile 500 in the process subsequent to S104. When "Saturation" is designated in the intent designation field 860, the host device 100 uses information appropriate for the A2B2 and B2A2 tags illustrated in FIG. 4 in the profile 500 in the process subsequent to S104.

First, the host device 100 obtains current output values CurrentOut according to the color conversion profile (including a combination of the profiles) designated in the profile selection fields 811 to 813 at each adjustment point P0 input in the target acceptance region 840 and the added third adjustment point Qx (S104). This is because the adjustment is executed using the output colors $cmyk_p$ corresponding to the colors of the output image IM0 formed on the print substrate ME1 as a reference. When there is information appropriate for the designation intent in the profile, the color conversion is executed according to the information appropriate for the designation intent.

In the following description, the third adjustment point Qx is assumed to be included in the adjustment point P0 when the adjustment point P0 is merely described.

For example, as illustrated in FIG. 19A, when only the input profile 610 is designated for the color conversion (a-1), the input values Input of each adjustment point P0 are CMYK values (which are assumed to be Cp, Mp, Yp, Kp). In this case, the current output values CurrentOut are Lab values (which are assumed to be Lp, ap, bp). Here, the variable p is a variable for identifying the adjustment point P0.

Here, as described above, conversion according to a profile is assumed to be indicated by $f_{icc}$ (first, second, and third arguments). Here, the first argument indicates a profile to be used. In the first argument, InputProfile indicates an input profile and OutputProfile indicates an output profile. DLProfile indicates a device link profile. In the second argument, A2B indicates conversion from device colors to device-independent colors and B2A indicates conversion from device-independent colors to device colors. A2B0 indicates conversion in accordance with the device link table. In the third argument, Input indicates input values (CMYK, RGB, Lab, or the like) of the adjustment point P0.

In the foregoing (a-1) case, the adjustment target profile 550 automatically becomes the input profile 610 and the current output values CurrentOut can be calculated by the following expression (see FIG. 20):

$$CurrentOut=f_{icc}(InputProfile,A2B,Input).$$

As illustrated in FIG. 19B, when only the output profile 620 is designated for the color conversion (a-2), the input values at each adjustment point P0 are Lab values (which are assumed to be Lp, ap, bp). In this case, the current output values CurrentOut are cmyk values (where are assumed to be cp, mp, yp, kp).

In the foregoing (a-2) case, the adjustment target profile 550 automatically becomes the output profile 620 and the current output values CurrentOut can be calculated by the following expression (see FIG. 20):

$$CurrentOut=f_{icc}(OutputProfile,B2A,Input).$$

As illustrated in FIG. 19C, when the device link profile 630 is designated for the color conversion (a-3), the input values Input at each adjustment point P0 are the CMYK values (Cp, Mp, Yp, Kp). In this case, the current output values CurrentOut are cmyk values (cp, mp, yp, kp).

In the foregoing (a-3) case, the adjustment target profile 550 automatically becomes the device link profile 630 and the current output values CurrentOut can be calculated by the following expression (see FIG. 20):

$$CurrentOut=f_{icc}(DLProfile,A2B0,Input).$$

As illustrated in FIGS. 19D and 19E, when the combination of the profiles 610 and 620 is designated for the color conversion (b-1) and (b-2), the input values Input at each adjustment point P0 are the CMYK values (Cp, Mp, Yp, Kp). In this case, the current output values CurrentOut are cmyk values (cp, mp, yp, kp).

In the foregoing (b-1) and (b-2) cases, when the adjustment target profile 550 is the input profile 610 or the output profile 620, the current output values CurrentOut can be calculated by the following expression (see FIG. 20):

$$CurrentOut=f_{icc}(OutputProfile,B2A,f_{icc}(InputProfile,A2B,Input)).$$

After the current output values CurrentOut are calculated, the host device 100 obtains the target output values TargetOut according to the color conversion profile (including the combination of the profiles) designated in the profile selection fields 811 to 813 and the adjustment target color space CS6 designated in the adjustment target color space selection field 830 at each adjustment point P0 (including the third adjustment point Qx) (S106). This is because the adjustment is executed using the output colors $cmyk_p$ corresponding to the colors of the output image IM0 formed on the print substrate ME1 as a reference. When there is the information appropriate for the designation intent in the profile, the color conversion is executed according to the information in accordance with the designation intent. The target output values TargetOut of the specific point SP are the current output values CurrentOut.

For example, as illustrated in FIG. 21A, when only the input profile 610 is designated for the color conversion and the input color space CS4 is designated in the adjustment target color space CS6 (a-1-1), the adjustment amounts AdjustData are added to the CMYK values (Cp, Mp, Yp, Kp) in the CMYK color space. The adjustment amounts AdjustData are expressed with relative values ($\Delta Cp$, $\Delta Mp$, $\Delta Yp$, $\Delta Kp$). In the CMYK color space, the CMYK values after the adjustment are expressed as (Cp+$\Delta Cp$, Mp+$\Delta Mp$, Yp+$\Delta Yp$, Kp+$\Delta Kp$).

In the foregoing (a-1-1) case, the target output values TargetOut can be calculated by the following expression (see FIG. 23):

$$TargetOut=f_{icc}(InputProfile,A2B,Input+AdjustData).$$

As illustrated in FIG. 21B, when only the input profile 610 is designated for the color conversion and the output color space CS5 is designated in the adjustment target color space CS6 (a-1-2), the adjustment amounts AdjustData are added to the Lab values (Lp, ap, bp) in the Lab color space. The adjustment amounts AdjustData are expressed with relative values (ΔLp, Δap, Δbp). In the Lab color space, the Lab values after the adjustment are expressed as (Lp+ΔLp, ap+Δap, bp+Δbp).

In the foregoing (a-1-2) case, the target output values TargetOut can be calculated by the following expression (see FIG. 23):

TargetOut=$f_{icc}$(InputProfile,$A2B$,Input)+AdjustData.

As illustrated in FIG. 21C, when only the output profile 620 is designated for the color conversion and the input color space CS4 is designated in the adjustment target color space CS6 (a-2-1), the adjustment amounts AdjustData are added to the Lab values (Lp, ap, bp) in the Lab color space. The adjustment amounts AdjustData are expressed with relative values (ΔLp, Δap, Δbp). In the Lab color space, the Lab values after the adjustment are expressed as (Lp+ΔLp, ap+Δap, bp+Δbp).

In the foregoing (a-2-1) case, the target output values TargetOut can be calculated by the following expression (see FIG. 23):

TargetOut=$f_{icc}$(OutputProfile,$B2A$,Input+AdjustData).

As illustrated in FIG. 21D, when only the output profile 620 is designated for the color conversion and the output color space CS5 is designated in the adjustment target color space CS6 (a-2-2), the adjustment amounts AdjustData are added to the cmyk values (cp, mp, yp, kp) in the cmyk color space. The adjustment amounts AdjustData are expressed with relative values (Δcp, amp, Δyp, Δkp). In the cmyk color space, the cmyk values after the adjustment are expressed as (cp+Δcp, mp+Δmp, yp+Δyp, kp+Δkp).

In the foregoing (a-2-2) case, the target output values TargetOut can be calculated by the following expression (see FIG. 23):

TargetOut=$f_{icc}$(OutputProfile,$B2A$,Input)+AdjustData.

when the device link profile 630 is designated for the color conversion and the input color space CS4 is designated in the adjustment target color space CS6 (a-3-1), the adjustment amounts AdjustData are added to the CMYK values (Cp, Mp, Yp, Kp) in the CMYK color space. The adjustment amounts AdjustData are expressed with relative values (ΔCp, ΔMp, ΔYp, ΔKp). In the CMYK color space, the CMYK values after the adjustment are expressed as (Cp+ΔCp, Mp+ΔMp, Yp+ΔYp, Kp+ΔKp).

In the foregoing (a-3-1) case, the target output values TargetOut can be calculated by the following expression (see FIG. 23):

TargetOut=$f_{icc}$(DLProfile,$A2B0$,Input+AdjustData).

When the device link profile 630 is designated for the color conversion and the output color space CS5 is designated in the adjustment target color space CS6 (a-3-2), the adjustment amounts AdjustData are added to the cmyk values (cp, mp, yp, kp) in the cmyk color space. The adjustment amounts AdjustData are expressed with relative values (Δcp, Δmp, Δyp, Δkp). In the cmyk color space, the cmyk values after the adjustment are expressed as (cp+Δcp, mp+Δmp, yp+Δyp, kp+Δkp).

In the foregoing (a-3-2) case, the target output values TargetOut can be calculated by the following expression (see FIG. 23):

TargetOut=$f_{icc}$(DLProfile,$A2B0$,Input)+AdjustData.

Although not illustrated, the Lab colors space may also be assumed to be designated in the adjustment target color space CS6. In this case, the Lab color space is the output color space CS5 in the input profile 610 and is the input color space CS4 in the output profile 620. The target output values TargetOut can be calculated, for example, by referring to the output profile used to generate the device link profile 630.

As illustrated in FIG. 22A, when a combination of the profiles 610 and 620 is designated for the color conversion and the input color space CS4 of the input profile 610 is designated in the adjustment target color space CS6 (b-1-1), the adjustment amounts AdjustData are added to the CMYK values (Cp, Mp, Yp, Kp) in the CMYK color space. The adjustment amounts AdjustData are expressed with relative values (ΔCp, ΔMp, ΔYp, ΔKp). In the CMYK color space, the CMYK values after the adjustment are expressed as (Cp+ΔCp, Mp+ΔMp, Yp+ΔYp, Kp+ΔKp).

In the foregoing (b-1-1) case, the target output values TargetOut can be calculated by the following expression (see FIG. 23):

TargetOut=$f_{icc}$(OutputProfile,$B2A$,$f_{icc}$(InputProfile, $A2B$,Input+AdjustData)).

The foregoing expression is the same even when the adjustment target profile 550 is the output profile 620.

As illustrated in FIG. 22B, when the combination of the profiles 610 and 620 is designated for the color conversion and the output color space CS5 of the output profile 620 is designated for the adjustment target color space CS6 (b-1-2), the adjustment amounts AdjustData are added to the cmyk values (cp, mp, yp, kp) in the cmyk color space. The adjustment amounts AdjustData are expressed with relative values (Δcp, Δmp, Δyp, Δkp). In the cmyk color space, the cmyk values after the adjustment are expressed as (cp+Δcp, mp+Δmp, yp+Δyp, kp+Δkp).

In the foregoing (b-1-2) case, the target output values TargetOut can be calculated by the following expression (see FIG. 23):

TargetOut=$f_{icc}$(OutputProfile,$B2A$,$f_{icc}$(InputProfile, $A2B$,Input))+AdjustData.

The foregoing expression is the same even when the adjustment target profile 550 is the output profile 620.

As illustrated in FIG. 22C, when the combination of the profiles 610 and 620 is designated for the color conversion and PCS (the output color space CS5 in the input profile 610 and the input color space CS4 in the output profile 620) is designated in the adjustment target color space CS6 (b-1-3), the adjustment amounts AdjustData are added to the Lab values (Lp, ap, bp) in the Lab color space. The adjustment amounts AdjustData are expressed with relative values (ΔLp, Δap, Δbp). In the Lab color space, the Lab values after the adjustment are expressed as (Lp+ΔLp, ap+Δap, bp+Δbp).

In the foregoing (b-1-3) case, the target output values TargetOut can be calculated by the following expression (see FIG. 23):

TargetOut=$f_{icc}$(OutputProfile,$B2A$,$f_{icc}$(InputProfile, $A2B$,Input)+AdjustData).

The foregoing expression is the same even when the adjustment target profile 550 is the output profile 620.

The calculation of the target output values TargetOut can be omitted when the adjustment target T0 is expressed with the output coordinate values. The calculation of the target output values TargetOut can be executed when the adjustment target T0 is not expressed with the output coordinate values.

After the target output values TargetOut are calculated, the host device 100 acquires the input values Input_P and the adjustment target values TargetOut_P at each adjustment point P0 in the adjustment target profile 550 (S108). This is because the correspondent relation between the input values and the output values in the adjustment target profile 550 is adjusted. When there is information regarding the designation intent in the profile, the color conversion is executed according to the information appropriate for the designation intent.

In the (a-1), (a-2), and (a-3) cases illustrated in FIGS. 19A, 19B, and 19C, that is, when one profile (one of the profiles 610, 620, and 630) is designated for the color conversion, the designated profile is the adjustment target profile 550. Accordingly, the input values Input of the designated profile are used as the input values Input_P in the adjustment target profile 550, and the target output values TargetOut of the designated profile are used as the adjustment target values TargetOut_P in the adjustment target profile 550. The expressions are as follows (see FIG. 25):

Input_P=Input; and

TargetOut_P=TargetOut.

The current output values CurrentOut_P in the adjustment target profile 550 are the current output values CurrentOut of the designated profile:

CurrentOut_P=CurrentOut

When the relative value of the adjustment target T0 is expressed in the output color space CS5 of the adjustment target profile 550, TargetOut_P−CurrentOut_P is set.

Figure 24A:
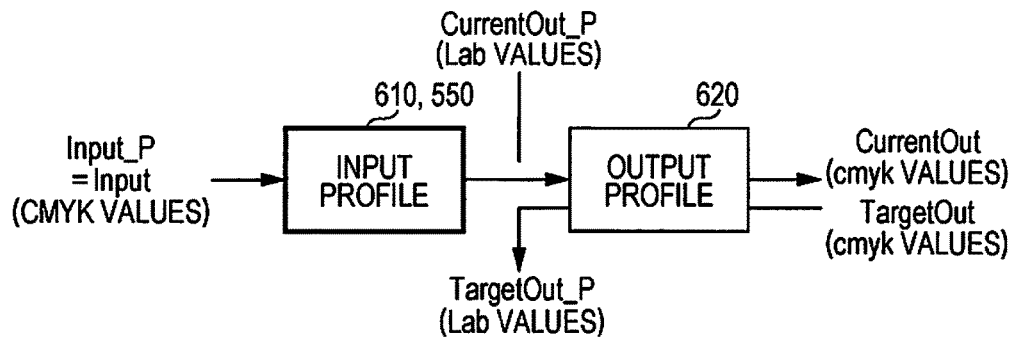
FIGS. 24A and 24B are diagrams schematically illustrating an example in which input values and adjustment target values of an adjustment target profile are obtained.

As illustrated in FIG. 24A, in the case (b-1) illustrated in FIG. 19D, that is, when the combination of the profiles 610 and 620 is selected for the color conversion and the input profile 610 is designated in the adjustment target profile 550, the input values Input of the combination of the profiles 610 and 620 are used as the input values Input_P in the adjustment target profile 550. The adjustment target values TargetOut_P (the Lab values) of the adjustment target profile 550 can be calculated from the target output values TargetOut which are the cmyk values (see FIG. 25):

Input_P=Input; and

TargetOut_P=$f_{icc}$(OutputProfile,A2B,TargetOut).

The reason why the adjustment target values TargetOut_P (the Lab values) of the adjustment target profile 550 are obtained from the target output values TargetOut (the cmyk values) is to execute the adjustment using the output colors cmyk$_p$ corresponding to the colors of the output image IM0 as a reference.

The current output values CurrentOut_P (the Lab values) in the adjustment target profile 550 are expressed in the following expression:

CurrentOut_P=$f_{icc}$(InputProfile,A2B,Input).

The relative values of the adjustment target T0 are expressed in the output color space CS5 of the adjustment target profile 550, TargetOut_P−CurrentOut_P is set.

Figure 24B:
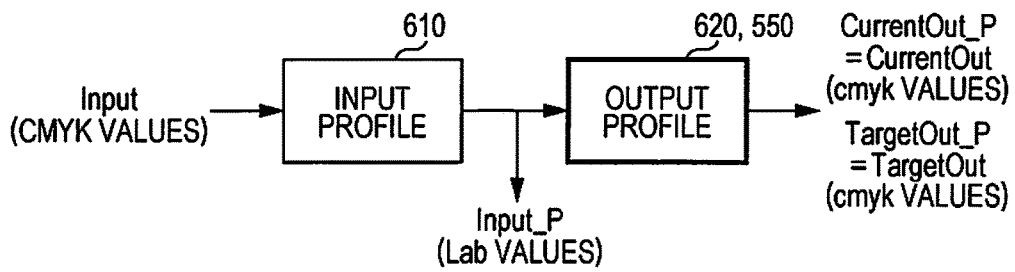

As illustrated in FIG. 24B, in the (b-2) case illustrated in FIG. 19E, that is, when the combination of the profiles 610 and 620 is selected for the color conversion and the output profile 620 is designated in the adjustment target profile 550, the target output values TargetOut of the combination of the profiles 610 and 620 are used as the adjustment target values TargetOut_P in the adjustment target profile 550. The input values Input_P (the Lab values) of the adjustment target profile 550 can be calculated from the input values Input (the CMYK values) which are the CMYK values (see FIG. 25):

Input_P=$f_{icc}$(InputProfile,A2B,Input); and

TargetOut_P=TargetOut.

The current output values CurrentOut_P (the cmyk values) in the adjustment target profile 550 are the current output values CurrentOut of the combination of the profiles 610 and 620:

CurrentOut_P=CurrentOut.

When the relative values of the adjustment target T0 are expressed in the output color space CS5 of the adjustment target profile 550, TargetOut_P−CurrentOut_P is set.

After the input values Input_P in the adjustment target profile 550 and the adjustment target values TargetOut_P are acquired, the host device 100 adjusts the adjustment range A0 of the adjustment target profile 550 based on the adjustment target T0 in S110 to S112.

First, the concept that the adjustment target profile 550 is adjusted in the adjustment range A0 will be described with reference to FIGS. 26A and 26B. Here, in FIGS. 26A and 26B, the horizontal axis represents input values along a certain coordinate axis of the input color space CS4 and the vertical axis represents output values along a certain coordinate axis of the output color space CS5. For example, when the input color space CS4 is the CMYK color space, the horizontal axis is the C, M, Y, or K axis. When the output color space CS5 is the Lab color space, the vertical axis is the L, a, or b axis. A white circle on the horizontal axis indicates the lattice point GD0.

Figure 26A:
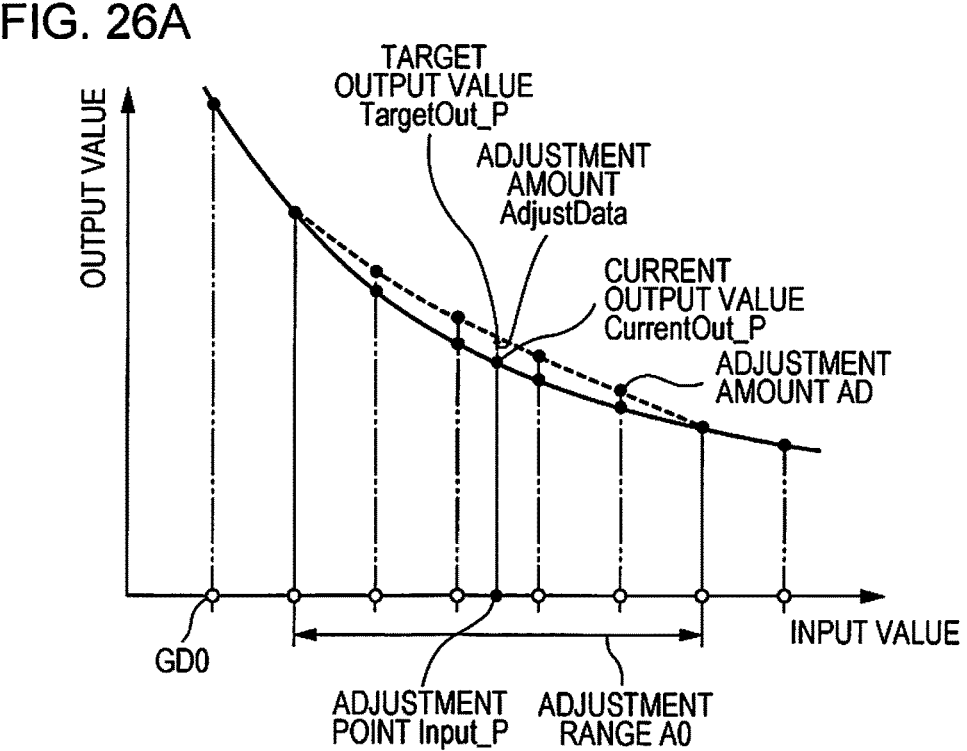
FIG. 26A is a diagram schematically illustrating adjustment amounts of each lattice point when adjustment is executed in an output color space of an adjustment target profile.

FIG. 26A schematically exemplifies the adjustment amounts AD of each lattice point GD0 when the output values are adjusted. The adjustment point P0 corresponds to the input values Input_P. When the adjustment amounts AdjustData are given as the adjustment target T0, the adjustment target values TargetOut_P obtained by adding the adjustment amounts AdjustData to the current output values CurrentOut_P corresponding to the input values Input_P are set. Of course, when the adjustment target color space CS6 is the cmyk color space, the current output values CurrentOut_P and the adjustment target values TargetOut_P are expressed with the cmyk values, and the adjustment amounts AdjustData are expressed with the relative values (Δcp, Δmp, Δyp, Δkp) of the cmyk values. When the adjustment target color space CS6 is the Lab color space, the current output values CurrentOut_P and the adjustment target values TargetOut_P are expressed with the Lab values, and the adjustment amounts AdjustData are expressed with the relative values (ΔLp, Δap, Δbp) of the Lab values.

The adjustment range A0 is set in the adjustment amounts AdjustData through an input to the adjustment range designation field 850 and the target acceptance region 840 illustrated in FIG. 7 and the process of S224 of FIG. 6. When "radius" is designated in the adjustment range designation field 850, basically, the adjustment amounts of the output values with respect to the input values Input_P are set to the maximum and the adjustment amounts at the boundary of the adjustment range A0 is set to 0. Here, since the actual adjustment is executed on the lattice points GD0 of the adjustment target profile 550, the adjustment is affected up to a range broader than the set adjustment range A0 in some cases.

Figure 26B:
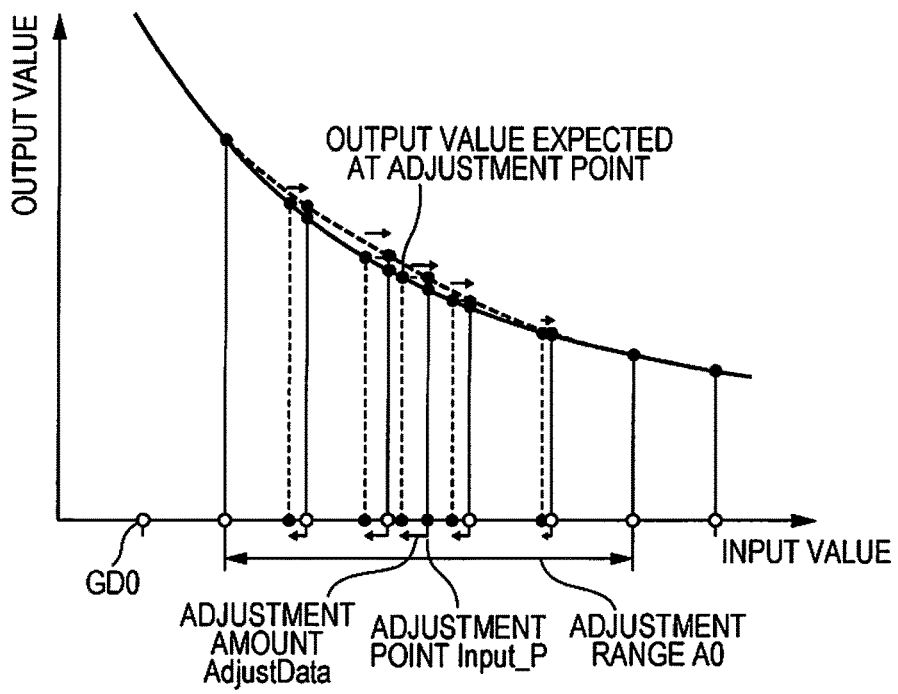
FIG. 26B is a diagram schematically illustrating adjustment amounts of each lattice point when adjustment is executed in an input color space of an adjustment target profile.

FIG. 26B schematically exemplifies the adjustment amounts AD of each lattice point GD0 when the input values are adjusted. The adjustment point P0 corresponds to the input values Input_P. When the adjustment amounts AdjustData are given as the adjustment target T0, the output values corresponding to the input values Input_P+AdjustData obtained by adding the adjustment amounts AdjustData to the input values Input_P are output values expected at the adjustment point P0. Of course, when the adjustment target color space CS6 is the CMYK color space, the input values Input_P are expressed with the CMYK values and the adjustment amounts AdjustData are expressed with the relative values ($\Delta$Cp, $\Delta$Mp, $\Delta$Yp, $\Delta$Kp) of the CMYK values. When the adjustment target color space CS6 is the Lab color space, the input values Input_P are expressed with the Lab values, and the adjustment amounts AdjustData are expressed with the relative values ($\Delta$Lp, $\Delta$ap, $\Delta$bp) of the Lab values.

The above-described correction is executed on all the coordinate axes of the input color space CS4 and all the coordinate values of the output color space CS5.

Next, an example in which the adjustment amounts AD is set at each lattice point GD0 of the adjustment range A0 will be described with reference to FIGS. 27A and 27B. Here, in FIGS. 27A and 27B, the horizontal axis represents input values and the vertical axis represents the adjustment amounts AD of the output values. A triangle on the horizontal axis indicates the lattice point (excluding a nearest lattice point GDnearest) within the adjustment range A0 and a rectangle on the horizontal axis indicates the lattice point at which the output values outside of the adjustment range A0 are not corrected.

Figure 27A:
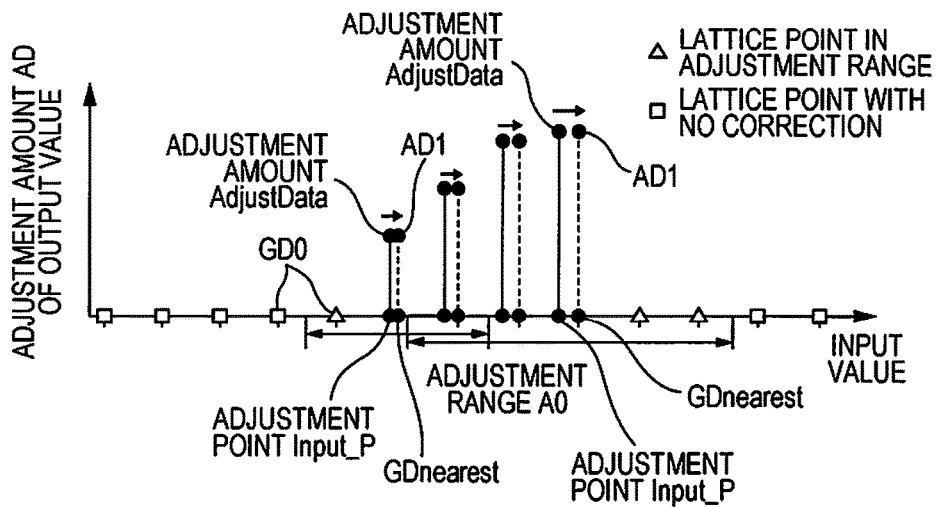
FIG. 27A is a diagram schematically illustrating an example in which adjustment amounts of an output value at a nearest lattice point are determined.

As illustrated in FIG. 27A, the host device 100 determines the adjustment amounts AD1 of the output values for the nearest lattice point GDnearest which is a lattice point closest to the adjustment point P0 at each adjustment point P0 (S110 of FIG. 5). FIG. 27A illustrates an example in which the adjustment amounts AD1 of the output values are determined when there are four adjustment points P0 (the input values Input_P) on a certain coordinate axis of the input color space CS4. In the example of FIG. 27A, the adjustment amounts AdjustData for the input values Input_P are set as the adjustment amounts AD1 of the output values for the nearest lattice point GDnearest without change. Of course, the technology is no limited to the adjustment amounts AdjustData set as the adjustment amounts AD1 of the output values for the nearest lattice point GDnearest.

Figure 27B:
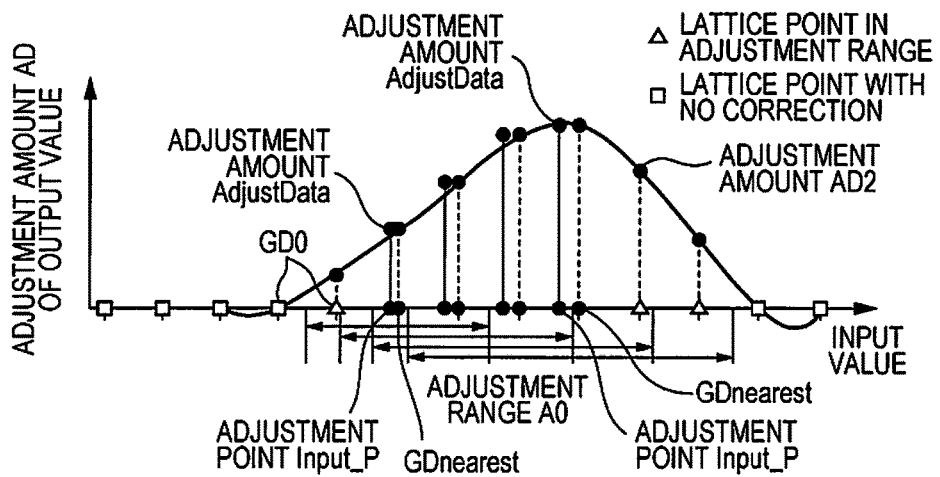
FIG. 27B is a diagram schematically illustrating an example in which adjustment amounts of an output value at a lattice point in the vicinity of the nearest lattice point are determined.

After the host device 100 determines the adjustment amounts AD1 of the output values at the nearest lattice point GDnearest, as illustrated in FIG. 27B, the host device 100 determines an adjustment amounts AD2 of the output values at a lattice point (a lattice point with the triangle) around the nearest lattice point GDnearest in the adjustment range A0 (S112 of FIG. 5). For example, by setting the adjustment amounts of the output values at the lattice point outside of the adjustment range A0 to 0, setting AdjustData as the adjustment amounts AD1 of the output values at each nearest lattice point GDnearest described above, and executing interpolation calculation by a 3-dimensional or 4-dimensional cubic spline function, it is possible to determine the adjustment amounts AD2 of the output values at a surrounding lattice point. Here, when the input color space CS4 is the CMYK color space, the interpolation calculation may be executed by a 4-dimensional cubic spline function. When the input color space CS4 is the Lab color space, the interpolation calculation may be executed by a 3-dimensional cubic spline function. By executing the interpolation calculation, the adjustment amounts AD2 of the output values at the surrounding lattice point are smoothly connected between the adjustment amounts AD1 of the output values at the nearest lattice point GDnearest and the adjustment amounts of "0" at the lattice point outside of the adjustment range A0.

Of course, the technology is not limited to the spline functions used for the interpolation calculation.

Some users want to adjust all the colors of gradation continuous from the first adjustment point P1 to the second adjustment point P2 as in the gradation image IM1 illustrated in FIG. 28 in some cases. When the first adjustment point P1 is distant from the second adjustment point P2 in the input color space CS4, the adjustment ranges A1 and A2 of the adjustment points P1 and P2 do not overlap. Even when the adjustment amounts AdjustData are set by the adjustment points P1 and P2, the color between the adjustment points P1 and P2 is not adjusted and the gradation property of the output image deteriorates in some cases. However, when the adjustment ranges A1 and A2 of the adjustment points P1 and P2 are set to be broad, even color which is not desired to be adjusted is adjusted. To prevent this, it is necessary to set many adjustment points and the adjustment amounts AdjustData between the adjustment points P1 and P2. In particular, when the adjustment points P1 and P2 are distant from each other, setting of the adjustment points and the adjustment amounts AdjustData is troublesome to that extent.

In the specific example, the third adjustment point Qx is automatically added between the pair of designated adjustment points P1 and P2, the adjustment amounts AdjustData and the adjustment range A3 of the third adjustment point Qx are also automatically determined, and such adjustment data is also reflected in the adjustment of the profile 500. Accordingly, the work for improving the gradation property of the output image is reduced.

After the adjustment amounts AD of the output values at each lattice point of the adjustment range A0 are determined, the host device 100 reflects the determined adjustment amounts AD in the adjustment target profile 550 (S114 of FIG. 5). That is, values obtained by adding the adjustment amounts AD to the current output values at each lattice point of the adjustment range A0 may be written as the output values after updating in the adjustment target profile 550. For example, when the output color space CS5 of the adjustment target profile 550 is the cmyk color space, values (cq+$\Delta$cq, mq+$\Delta$mq, yq+$\Delta$yq, kq+$\Delta$kq) obtained by adding the adjustment amounts ($\Delta$cq, $\Delta$mq, $\Delta$yq, $\Delta$kq) to current output values (cq, mq, yq, kq) are the output values after the updating. When the output color space CS5 of the adjustment target profile 550 is the Lab color space, values (Lq+$\Delta$Lq, aq+$\Delta$aq, bq+$\Delta$bq) obtained by adding the adjustment amounts ($\Delta$Lq, $\Delta$aq, $\Delta$bq) to current output values (Lq, aq, bq) are the output values after the updating. Here, the variable q is a variable for identifying the lattice point in the adjustment range A0.

In this way, the correspondent relation of the adjustment target profile 550 is adjusted so that the current output values CurrentOut in the second color space CS2 are close to the target output values TargetOut. When there is the information appropriate for the designation intent in the adjustment target profile 550, the adjustment target profile 550 is adjusted in the correspondent relation appropriate for the designation intent.

After the adjustment target profile 550 is updated, the host device 100 obtains the current output values CurrentOut using the adjustment target profile 550 after the updating or the combination of the profiles including the adjustment target profile 550 after the updating at each adjustment point P0 (including the third adjustment point Qx) (S116). The current output values CurrentOut after the updating can be calculated using the same expression as the process of S104 described with reference to FIGS. 19A to 19E and 20. When there is the information appropriate for the designation intent in the profile, the color conversion is executed according to the information appropriate for the designation intent.

The host device 100 obtains differences d between the current output values CurrentOut after the updating and the target output values TargetOut at each adjustment point P0 (including the third adjustment point Qx) (S118). For example, the differences can be Euclid distances between points corresponding to the output values CurrentOut in the output color space CS5 of the adjustment target profile 550 and points corresponding to the target output values TargetOut.

In addition, the host device 100 determines whether an end condition of the repeated processes of S108 to S120 is established (S120). When the end condition is not established, the processes of S108 to S120 are repeated. When the end condition is established, the profile adjustment process ends. For example, when the differences d at all the adjustment points P0 are equal to or less than predetermined thresholds, the end condition can be established. When the repeated process reaches a specified number of times, the end condition may be established.

As described above, the adjustment target profile 550 is adjusted so that the current output values CurrentOut obtained from the input coordinate values corresponding to the adjustment point P0 according to the current adjustment target profile 550 or the combination of the profiles including the adjustment target profiles 550 are closed to the target output values TargetOut. In this way, since the adjustment target profile 550 is adjusted using the coordinate values indicating the output colors $cmyk_p$ as the reference, the profile used to convert the coordinate values of the color space can be adjusted with good color reproduction precision in the specific example. At this time, since the adjustment target profile 550 or the adjustment target color space CS6 can be designated, the specific example can flexibly correspond to a use environment of a user.

Since the history information 700 is stored in the private tag 523 of the profile, the relation between the adjustment target table and the history information 700 is maintained. When the table of the profile is readjusted, an unintended change in color is suppressed, and consequently a reattempt of adjustment work due to an operation mistake is suppressed. When another table is adjusted, the adjustment work is consequently saved. Further, the user can set the specific point SP so that the readjustment is not executed among the one or more adjustment points P0 included in the read history information 700. Accordingly, in the specific example, convenience of the work for adjusting the profile to be used to convert the coordinate values of the color space is improved.

(6) Modification Examples

Various modification examples of the invention can be considered.

For example, an output device is not limited to an ink jet printer, but may be an electrographic printer such as a laser printer, a 3-dimensional printer, a display device, or the like.

The kinds of color materials for forming an image are not limited to C, M, Y, and K, but may include Lc, Lm, dark yellow (Dy) with higher density than Y, orange (Or), green (Gr), light black (Lk) with lower density than K, unpigmented color materials for image quality improvement, or the like in addition to C, M, Y, and K.

Of course, the second color space is not limited to the cmyk color space, but may be the CMY color space, the RGB color space, or the like.

A target device is not limited to a target printer, but may be a display device or the like.

Of course, the first color space is not limited to the CMYK color space, but may be the CMY color space, the RGB color space, or the like.

The color spaces which can be selected as the adjustment target color space are not limited to the three kinds of color spaces, the first color space, the second color space, and the profile connection space, but may be two kinds of color spaces, the first color space and the second color space, may be two kinds of color spaces, the first color space and the profile connection space, or may be two kinds of color spaces, the second color space and the profile connection space.

The third adjustment point Q is not limited to the line connecting the adjustment points P1 and P2, but may be set at a position deviating from the line connecting the adjustment points P1 and P2.

Even when the adjustment range A0 is constant, the third target T3 at the third adjustment point Qx can be determined based on the first target T1 of the adjustment at the first adjustment point P1 and the second target T2 of the adjustment at the second adjustment point P2. Even when the targets T1 and T2 are determined in advance, the third adjustment range A3 can be determined based on the first adjustment range A1 in which the first adjustment point P1 is set as the base point and the second adjustment range A2 in which the second adjustment point P2 is set as the base point.

As exemplified in FIG. 29, the history information 700 may be utilized from another type of profile. In the example of FIG. 29, the device link profile 630 is used as the adjustment target profile 550 (the second profile 502), and the history information 700 of the output profile 620 (the first profile 501) combined with the input profile 610 is applied to the device link profile 630. For example, it is assumed that the adjustment amounts (the adjustment target T0) in the cmyk color space (CS2) are set in the output profile 620 combined with the input profile 610 and the adjustment amounts are stored in the private tag of the output profile 620. When the device link profile 630 is adjusted, the adjustment amounts set in the cmyk color space (CS2) can be read from the output profile 620, so that the device link profile 630 can be adjusted in the cmyk color space (CS2) based on the read adjustment amounts.

Of course, the output profile 620 combined with the input profile 610 may be used as the adjustment target profile 550 (the second profile 502) and the history information 700 of the device link profile 630 (the first profile 501) may be applied to the output profile 620.

For example, when important colors are determined for corporate colors or the like, the profile used in an operation is changed in some cases. When the adjustment point P0 or the adjustment range A0 may not be utilized from a different type of profile, the adjustment point P0 or the adjustment range A0 have to be input whenever the profile is changed. Thus, the work for adjusting the profile is troublesome to that extent. In the modification example, since the history information 700 can be utilized from another type of profile, inputting the adjustment point P0 or the adjustment range A0 is omitted when the profile is changed. Thus, the work of adjusting the profile is reduced.

Figure 30:
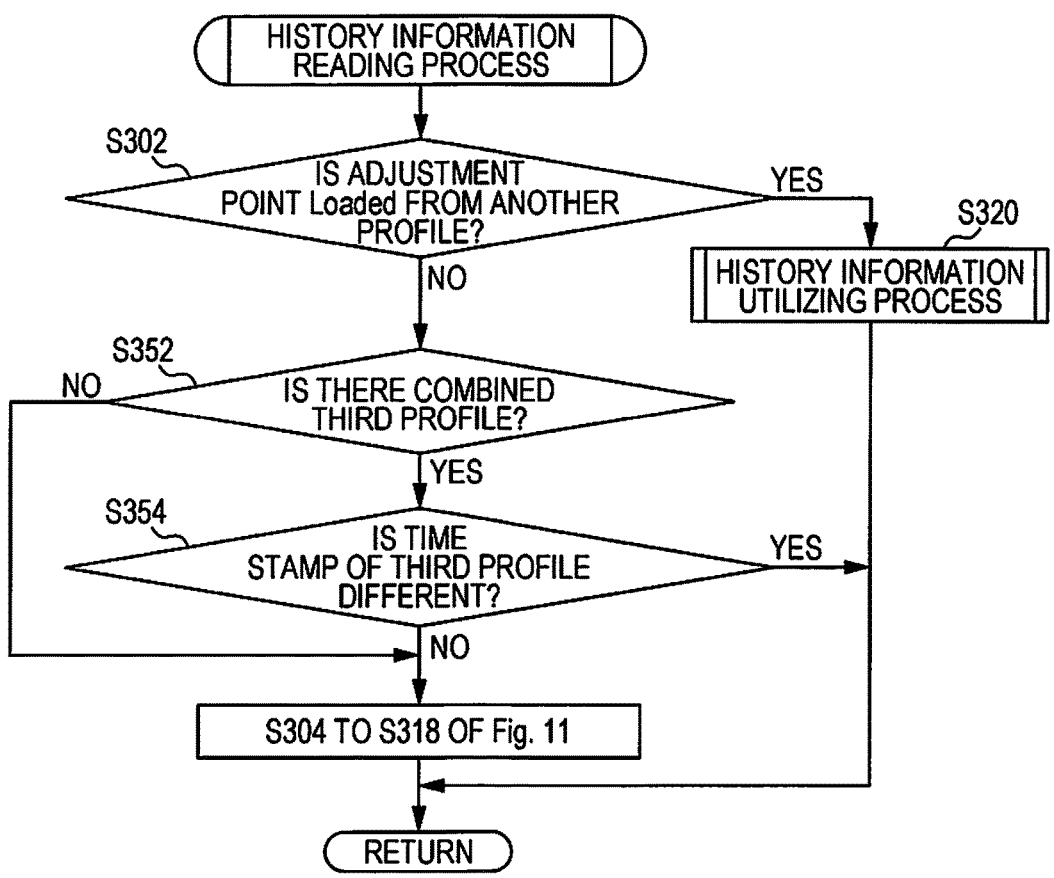
FIG. 30 is a flowchart illustrating an example of another history information reading process.

When the adjustment target profile 550 is combined with another third profile as in the history information reading process exemplified in FIG. 30, matching of the time stamp of the third profile may be set as an application condition of the history information 700. In the history information storing process illustrated in FIG. 15, the time stamp of the third profile combined with the adjustment target profile 550 (the first profile 501) is stored in the private tag 523 of the adjustment target profile 550. Accordingly, when a time stamp of a combination target profile stored in the private tag of the profile combined with the third profile is different from the time stamp of the third profile, the read history information is not used to readjust the first table 511.

In the history information reading process illustrated in FIG. 30, when the adjustment point P0 is not loaded from another profile (NO in S302), the host device 100 causes the process to branch depending on whether there is the third profile combined with the adjustment target profile 550 (S352). When there is no third profile combined with the adjustment target profile 550, the host device 100 executes the processes of S304 to S318 illustrated in FIG. 11 and ends the history information reading process.

When there is the third profile combined with the adjustment target profile 550, the host device 100 causes the process to branch depending on whether the time stamp of the combination target profile stored in the private tag 523 of the adjustment target profile 550 is different from the time stamp of the third profile which is the current combination target profile (S354). When the time stamps are different, there is a possibility of the profiles not being actually combined even when the name of the profile to be combined is the same as the name of the stored profile. Accordingly, when the time stamps are different, the host device 100 ends the history information reading process without executing the processes of S304 to S318 illustrated in FIG. 11. When the time stamps match each other, the host device 100 executes the processes of S304 to S318 illustrated in FIG. 11 and ends the history information reading process.

As described above, in the modification example, it is possible to provide the technology for suppressing a reattempt of the work when the profile is adjusted.

When the specific point SP is accepted and the profile is readjusted without the readjustment at the specific point SP, a region in which the history information 700 is stored is not limited to the private tag 523, but may be a storage region installed in the storage device 114 separately from the profile.

(7) Conclusion

As described above, according to the various aspects of the invention, it is possible to provide the technology or the like for improving convenience of work for adjusting a profile to be used to convert coordinate values of a color space. Of course, even in a technology realized by only constituent factors according to the independent claims, it is possible to obtain the above-described basic operational effects and advantages.

It is also embody configurations in which configurations disclosed in the above-described examples are substituted or combinations thereof are changed and configurations in which configurations disclosed in the known technologies and the above-described examples are substituted or combinations thereof are changed. The invention also includes such configurations.

This application claims priority under 35 U.S.C. § 119 to Japanese Patent Application No. 2017-122242, filed Jun. 22, 2017. The entire disclosure of Japanese Patent Application No. 2017-122242 is hereby incorporated herein by reference.

What is claimed is:

1. A profile adjustment method of adjusting a correspondent relation between coordinate values of an input color space and coordinate values of an output color space, the profile adjustment method comprising:
   storing history information indicating adjustment content of a first table defining the correspondent relation in a first profile at a private tag of the first profile;
   reading the history information from the private tag of the first profile; and
   using the read history information for at least one of readjustment of the first table and adjustment of a second table defining the correspondent relation in a second profile,
   wherein the history information includes one or more items among (A) to (H) below,
   (A) coordinates of an adjustment point corresponding to the adjustment target color,
   (B) an adjustment target at the adjustment point,
   (C) information which table an adjustment target table is among a table for one of a link profile in which first coordinate values of a first color space is associated with second coordinate values of a second color space, an input profile in which the first coordinate values are associated with third coordinate values of a profile connection space, and an output profile in which the third coordinate values are associated with the second coordinate values,
   (D) an adjustment range in which the adjustment point is set as a base point,
   (E) a combination of first coordinates and second coordinates for setting a third adjustment point at third coordinates based on a first adjustment point at the first coordinates and a second adjustment point at the second coordinates,
   (F) a file name of a third profile combined with the first profile in conversion from the first coordinate values to the second coordinate values,
   (G) an update date of the third profile, and
   (H) an original table before adjusting the first table.

2. The profile adjustment method according to claim 1, wherein the history information indicates adjustment content at one or more adjustment points corresponding to an adjustment target color,
   wherein the profile adjustment method further comprises accepting an adjustment point as a specific point so that readjustment is not executed among the one or more adjustment points included in the history information read in the reading of the history information, and
   wherein in the using of the read history information, the first table is readjusted so that the readjustment is not executed at the specific point.

3. The profile adjustment method according to claim 2, wherein the specific point is not accepted in the accepting of the adjustment point when the second table is adjusted in the using of the read history information.

4. The profile adjustment method according to claim 1, wherein the history information indicates adjustment content at one or more adjustment points corresponding to an adjustment target color,
   wherein the profile adjustment method further comprises accepting correction of the adjustment content at the adjustment point included in the history information read in the reading of the history information, addition of a new adjustment point corresponding to the adjustment target color, and setting of the adjustment content at the added adjustment point, and wherein in the using of the read history information, at least one of the readjustment of the first table and the adjustment of the second table is executed based on the adjustment point included in the read history information and the adjustment content at the added adjustment point.

5. The profile adjustment method according to claim 1, wherein the history information includes a plurality of items, and
wherein in the storing of the history information, designation of an item to be stored among the plurality of items is accepted and the item of which the designation is accepted is stored in the private tag.

6. The profile adjustment method according to claim 1, further comprising:
storing an update date of a third profile combined with the first profile in a private tag of the first profile in conversion from first coordinate values of a first color space to second coordinate values of a second color space,
wherein in the using of the read history information, the read history information is not used for the readjustment of the first table when an update date stored in a private tag of a profile combined with the third profile is different from the update date of the third profile.

7. The profile adjustment method according to claim 1, wherein the history information includes an original table before adjusting the first table, and
wherein in the reading of the history information, a cancellation instruction to return the first table to the original table is accepted, and the first table is returned to the original table when the cancellation instruction is accepted.

8. The profile adjustment method according to claim 1, wherein the history information includes coordinates of an adjustment point corresponding to an adjustment target color,
wherein the profile adjustment method further comprises accepting correction of adjustment content at the adjustment point included in the history information read in the reading of the history information, and
wherein in the using of the read history information, the second table is adjusted based on the adjustment content at the adjustment point included in the read history information.

9. The profile adjustment method according to claim 1, wherein the history information includes an adjustment range in which an adjustment point corresponding to an adjustment target color is set as a base point, and
wherein in the using of the read history information, the second table is adjusted in the adjustment range when the second table is adjusted.

10. The profile adjustment method according to claim 1, wherein the history information includes a first adjustment point at first coordinates, a second adjustment point at second coordinates, first adjustment data indicating degree of adjustment at the first adjustment point, and second adjustment data indicating degree of adjustment at the second adjustment point,
wherein the profile adjustment method further comprises:
setting a third adjustment point at third coordinates based on the first coordinates and the second coordinates; and
generating third adjustment data indicating degree of adjustment at the third adjustment point based on the first adjustment data and the second adjustment data, and wherein in the using of the read history information, the second table is adjusted based on the first adjustment data, the second adjustment data, and the third adjustment data.

11. The profile adjustment method according to claim 1, wherein a form of the first profile is one of a link profile in which first coordinate values of a first color space are associated with second coordinate values of a second color space, an input profile in which the first coordinate values are associated with third coordinate values of a profile connection space, and an output profile in which the third coordinate values are associated with the second coordinate values, and
wherein a form of the second profile is one of the link profile, the input profile, and the output profile.

12. A profile adjustment method comprising:
reading history information indicating adjustment content at one or more adjustment points corresponding to an adjustment target color in a profile defining a correspondent relation between coordinate values of an input color space and coordinate values of an output color space from a storage region;
accepting the adjustment point as a specific point so that readjustment is not executed among the one or more adjustment points included in the read history information; and
readjusts the profile so that the readjustment is not executed at the specific point.

13. A profile adjustment system that adjusts a correspondent relation between coordinate values of an input color space and coordinate values of an output color space, the profile adjustment system comprising:
a storage unit that stores history information indicating adjustment content of a first table defining the correspondent relation in a first profile at a private tag of the first profile;
a reading unit that reads the history information from the private tag of the first profile; and
a profile adjustment unit that uses the read history information for at least one of readjustment of the first table and adjustment of a second table defining the correspondent relation in a second profile,
wherein the history information includes one or more items among (A) to (H) below,
(A) coordinates of an adjustment point corresponding to the adjustment target color,
(B) an adjustment target at the adjustment point,
(C) information which table an adjustment target table is among a table for one of a link profile in which first coordinate values of a first color space is associated with second coordinate values of a second color space, an input profile in which the first coordinate values are associated with third coordinate values of a profile connection space, and an output profile in which the third coordinate values are associated with the second coordinate values,
(D) an adjustment range in which the adjustment point is set as a base point,
(E) a combination of first coordinates and second coordinates for setting a third adjustment point at third coordinates based on a first adjustment point at the first coordinates and a second adjustment point at the second coordinates,
(F) a file name of a third profile combined with the first profile in conversion from the first coordinate values to the second coordinate values,
(G) an update date of the third profile, and
(H) an original table before adjusting the first table.

14. The profile adjustment method according to claim 2,
wherein the history information indicates adjustment content at one or more adjustment points corresponding to an adjustment target color,
wherein the profile adjustment method further comprises accepting correction of the adjustment content at the adjustment point included in the history information read in the reading of the history information, addition of a new adjustment point corresponding to the adjustment target color, and setting of the adjustment content at the added adjustment point, and
wherein in the using of the read history information, at least one of the readjustment of the first table and the adjustment of the second table is executed based on the adjustment point included in the read history information and the adjustment content at the added adjustment point.

15. The profile adjustment method according to claim 3,
wherein the history information indicates adjustment content at one or more adjustment points corresponding to an adjustment target color,
wherein the profile adjustment method further comprises accepting correction of the adjustment content at the adjustment point included in the history information read in the reading of the history information, addition of a new adjustment point corresponding to the adjustment target color, and setting of the adjustment content at the added adjustment point, and
wherein in the using of the read history information, at least one of the readjustment of the first table and the adjustment of the second table is executed based on the adjustment point included in the read history information and the adjustment content at the added adjustment point.

16. The profile adjustment method according to claim 2,
wherein the history information includes a plurality of items, and
wherein in the storing of the history information, designation of an item to be stored among the plurality of items is accepted and the item of which the designation is accepted is stored in the private tag.

17. The profile adjustment method according to claim 3,
wherein the history information includes a plurality of items, and
wherein in the storing of the history information, designation of an item to be stored among the plurality of items is accepted and the item of which the designation is accepted is stored in the private tag.

18. The profile adjustment method according to claim 4,
wherein the history information includes a plurality of items, and
wherein in the storing of the history information, designation of an item to be stored among the plurality of items is accepted and the item of which the designation is accepted is stored in the private tag.

19. The profile adjustment method according to claim 2, further comprising:
storing an update date of a third profile combined with the first profile in a private tag of the first profile in conversion from first coordinate values of a first color space to second coordinate values of a second color space,
wherein in the using of the read history information, the read history information is not used for the readjustment of the first table when an update date stored in a private tag of a profile combined with the third profile is different from the update date of the third profile.

* * * * *